United States Patent
Kim et al.

(10) Patent No.: US 10,946,741 B1
(45) Date of Patent: Mar. 16, 2021

(54) AUTONOMOUS VEHICLE INCLUDING FOLDABLE ACCELERATOR PEDAL DEVICE AND FOLDABLE BRAKE PEDAL DEVICE

(71) Applicants: Hyundai Motor Company, Seoul (KR); Kia Motors Corporation, Seoul (KR); Kyung Chang Industrial Co., Ltd., Daegu (KR)

(72) Inventors: Eun Sik Kim, Gwangmyeong-si (KR); Hyeon Uk Kim, Daegu (KR); Sung Il Byun, Daegu (KR)

(73) Assignees: Hyundai Motor Company, Seoul (KR); Kia Motors Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 16/886,644

(22) Filed: May 28, 2020

(30) Foreign Application Priority Data

Nov. 15, 2019 (KR) .......................... 10-2019-0146872

(51) Int. Cl.
  *B60T 7/06* (2006.01)
  *G05D 1/00* (2006.01)
  (Continued)

(52) U.S. Cl.
  CPC .............. *B60K 26/02* (2013.01); *B60T 7/06* (2013.01); *B60K 2026/026* (2013.01);
  (Continued)

(58) Field of Classification Search
  CPC ...... B60R 21/06; B60K 26/02; B60K 26/021; B60K 2026/026; B60K 2026/027;
  (Continued)

(56) References Cited

U.S. PATENT DOCUMENTS 3,059,960 A * 10/1962 Komorowski ........... G05G 1/40
  296/64
3,108,651 A * 10/1963 Miller .................... B60K 26/02
  180/90.6
(Continued)

FOREIGN PATENT DOCUMENTS

| DE | 19907520 A1 | * | 8/2000 |
| JP | 2018092336 A | * | 6/2018 |
| KR | 20170137427 A | | 12/2017 |

OTHER PUBLICATIONS

Define constantly, Google Search, Oct. 30, 2020 (Year: 2020).*

*Primary Examiner* — Vinh Luong
(74) *Attorney, Agent, or Firm* — Slater Matsil, LLP

(57) ABSTRACT

An autonomous vehicle includes a foldable accelerator pedal device and a foldable brake pedal device. The foldable accelerator pedal device is an organ-type foldable accelerator pedal device, a pendant-type foldable accelerator pedal device, or a pressure-operation-type accelerator pedal device. The foldable brake pedal device is an organ-type foldable brake pedal device, a pendant-type foldable brake pedal device, and a pressure-operation-type brake pedal device. The foldable accelerator pedal device and the foldable brake pedal device are mounted in a space below the driver's seat. The foldable accelerator pedal device, the foldable brake pedal device, and the space below the driver's seat are configured to accommodate any one of the foldable accelerator pedal devices in combination with any one of the foldable brake pedal devices.

20 Claims, 30 Drawing Sheets

(51) Int. Cl.
*F16H 19/00* (2006.01)
*B60K 26/02* (2006.01)
*B60T 7/04* (2006.01)

(52) U.S. Cl.
CPC ......... *B60K 2026/027* (2013.01); *B60T 7/042* (2013.01); *B60T 2220/04* (2013.01)

(58) Field of Classification Search
CPC ........ B60T 7/06; B60T 7/042; B60T 2220/04; G05G 1/36; G05G 5/03; G05G 1/38; G05G 1/34; B62D 1/26; B62D 1/22; G05D 1/0088; G06D 2201/0212
USPC .......................................................... 74/512
See application file for complete search history.

(56) References Cited

U.S. PATENT DOCUMENTS

| | | | |
|---|---|---|---|
| 8,770,616 B1 * | 7/2014 | Draper | B60N 3/066 |
| | | | 280/728.1 |
| 9,802,638 B1 * | 10/2017 | Stoffel | G05G 1/36 |
| 2003/0094070 A1 * | 5/2003 | O'Neill | G05G 1/36 |
| 2003/0188600 A1 * | 10/2003 | Slanec | B60K 23/00 |
| 2004/0237700 A1 * | 12/2004 | Wurn | G05G 1/38 |
| 2010/0263469 A1 * | 10/2010 | Ohtsubo | B60N 3/06 |
| | | | 74/478 |
| 2010/0319480 A1 * | 12/2010 | Nebuya | G05G 1/46 |
| | | | 74/513 |
| 2012/0006149 A1 * | 1/2012 | Galea | G05G 1/327 |
| | | | 74/560 |
| 2015/0107401 A1 * | 4/2015 | Farrell | G05G 5/05 |
| | | | 74/512 |
| 2017/0090504 A1 * | 3/2017 | Kadoi | G05G 1/44 |
| 2018/0052483 A1 * | 2/2018 | Brown | G05G 1/44 |

\* cited by examiner

AUTONOMOUS VEHICLE INCLUDING FOLDABLE ACCELERATOR PEDAL DEVICE AND FOLDABLE BRAKE PEDAL DEVICE

CROSS-REFERENCE TO RELATED APPLICATIONS

This application claims priority to Korean Patent Application No. 10-2019-0146872, filed in the Korean Intellectual Property Office on Nov. 15, 2019, which application is hereby incorporated herein by reference.

TECHNICAL FIELD

The present invention relates to an autonomous vehicle including a foldable accelerator pedal device and a foldable brake pedal device.

BACKGROUND

A vehicle is provided with an accelerator pedal and a brake pedal, which are operated by the foot of a driver.

An accelerator pedal and a brake pedal are classified, depending on the installation structure thereof, into a pendant type, which is suspended on a dash panel, and an organ type, which is installed on a floor panel. In addition, there is a pressure-operation type, which generates an acceleration signal and a brake signal in response to the pressure that is generated when a driver steps on a pad.

A pendant-type pedal is configured such that a pedal housing is secured to a dash panel, which constitutes a vehicle body, and a pedal arm is suspended on the pedal housing. An organ-type pedal is configured such that a pedal housing is secured to a floor panel, which constitutes a vehicle body, and a driver steps on a pad in the manner of a pedal of a musical organ.

An autonomous vehicle is a smart vehicle, to which autonomous driving technology is applied such that the vehicle travels autonomously to a destination without the necessity for a driver to directly operate a handle, an accelerator pedal, a brake pedal, etc. Such an autonomous vehicle has been actively developed recently.

Generally, when an autonomous driving situation is realized, it is possible to select a manual driving mode, in which the driver manually drives the vehicle, and an autonomous driving mode, in which the vehicle travels autonomously to a destination without the necessity for the driver to manually drive the vehicle.

In the autonomous driving mode, it is desirable for the driver to be able to take a comfortable rest with the legs stretched. However, if the pedals (the accelerator pedal and the brake pedal) remain exposed in the indoor space below the driver's seat in the autonomous driving mode, they may be an obstacle to the driver's rest.

Further, in the autonomous driving situation, in which the driver does not operate the pedals of the vehicle (the accelerator pedal and the brake pedal), when the driver operates the pedals, the controller of the vehicle determines that the driver desires to terminate the autonomous driving mode and to manually drive the vehicle, and performs control so as to terminate the autonomous driving mode.

However, since the pedals of the vehicle are installed so as to be exposed in the space below the driver's seat, the driver may inadvertently operate the pedals during autonomous driving (erroneous operation of the pedals), which may lead to an accident depending on the road conditions, the distance between vehicles, or the like.

The information disclosed in this Background of the Invention section is only for enhancement of understanding of the general background of the invention and should not be taken as an acknowledgement or any form of suggestion that this information forms the related art already known to a person skilled in the art.

SUMMARY

The present invention relates to an autonomous vehicle including a foldable accelerator pedal device and a foldable brake pedal device. Particular embodiments relate to an autonomous vehicle in which any one of an organ-type foldable accelerator pedal device, a pendant-type foldable accelerator pedal device, and a pressure-operation-type accelerator pedal device and any one of an organ-type foldable brake pedal device, a pendant-type foldable brake pedal device, and a pressure-operation-type brake pedal device are selectively combined into one group and are mounted depending on the driver's preference.

Embodiments of the invention address a need to develop a new pedal device for exposing pedals to the indoor space of the vehicle such that the driver is capable of operating the pedals in the manual driving mode, in which the driver manually drives the vehicle, and for preventing the exposure of the pedals such that the driver is not capable of operating the pedals in the autonomous driving mode, thereby providing a comfortable rest to the driver, preventing erroneous operation of the pedals, and consequently ensuring safety.

Embodiments of the invention can solve problems addressed above. For example, embodiments provide an autonomous vehicle in which any one of an organ-type foldable accelerator pedal device, a pendant-type foldable accelerator pedal device, and a pressure-operation-type accelerator pedal device and any one of an organ-type foldable brake pedal device, a pendant-type foldable brake pedal device, and a pressure-operation-type brake pedal device are selectively combined into one group and are mounted depending on the driver's preference, thereby enhancing marketability of the product.

In accordance with one embodiment, an autonomous vehicle include a foldable accelerator pedal device and a foldable brake pedal device, in which the foldable accelerator pedal device includes any one of an organ-type foldable accelerator pedal device, a pendant-type foldable accelerator pedal device, or a pressure-operation-type accelerator pedal device. The foldable brake pedal device includes any one of an organ-type foldable brake pedal device, a pendant-type foldable brake pedal device, and a pressure-operation-type brake pedal device, and any one of the organ-type foldable accelerator pedal device, the pendant-type foldable accelerator pedal device, and the pressure-operation-type accelerator pedal device and any one of the organ-type foldable brake pedal device, the pendant-type foldable brake pedal device, and the pressure-operation-type brake pedal device are selectively combined, and are mounted in the space below the driver's seat.

Each of the foldable accelerator pedal device and the foldable brake pedal device may include a pedal housing having a predetermined shape to define the external appearance thereof, and the pedal housing of the foldable accelerator pedal device and the pedal housing of the foldable brake pedal device may be mounted so as to be in surface contact with each other.

The foldable accelerator pedal device may be mounted such that one side surface thereof is in close contact with a side surface of a console in the space below the driver's seat, and the foldable brake pedal device may be mounted such that one side surface thereof is in close surface contact with the opposite side surface of the foldable accelerator pedal device.

The organ-type foldable accelerator pedal device, the pendant-type foldable accelerator pedal device, and the pressure-operation-type accelerator pedal device may be formed to have the same width in the direction parallel to a front surface of the pedal housing. The organ-type foldable brake pedal device, the pendant-type foldable brake pedal device, and the pressure-operation-type brake pedal device may be formed to have the same width in the direction parallel to the front surface of the pedal housing. Any one of the organ-type foldable accelerator pedal device, the pendant-type foldable accelerator pedal device, and the pressure-operation-type accelerator pedal device and any one of the organ-type foldable brake pedal device, the pendant-type foldable brake pedal device, and the pressure-operation-type brake pedal device may be selectively combined, and may be mounted in the space below the driver's seat such that the top surface of the foldable accelerator pedal device and the top surface of the foldable brake pedal device match each other without a height difference therebetween in the direction vertical to the front surface of the pedal housing.

The organ-type foldable accelerator pedal device and the organ-type foldable brake pedal device may be combined into one group, and may be mounted in the space below the driver's seat.

The pendant-type foldable accelerator pedal device and the pendant-type foldable brake pedal device may be combined into one group, and may be mounted in the space below the driver's seat.

The pressure-operation-type accelerator pedal device and the pressure-operation-type brake pedal device may be combined into one group, and may be mounted in the space below the driver's seat.

The organ-type foldable accelerator pedal device and the pendant-type foldable brake pedal device may be combined into one group, and may be mounted in the space below the driver's seat.

The organ-type foldable accelerator pedal device and the pressure-operation-type brake pedal device may be combined into one group, and may be mounted in the space below the driver's seat.

The pendant-type foldable accelerator pedal device and the organ-type foldable brake pedal device may be combined into one group, and may be mounted in the space below the driver's seat.

The pendant-type foldable accelerator pedal device and the pressure-operation-type brake pedal device may be combined into one group, and may be mounted in the space below the driver's seat.

The pressure-operation-type accelerator pedal device and the organ-type foldable brake pedal device may be combined into one group, and may be mounted in the space below the driver's seat.

The pressure-operation-type accelerator pedal device and the pendant-type foldable brake pedal device may be combined into one group, and may be mounted in the space below the driver's seat.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Figure 1:
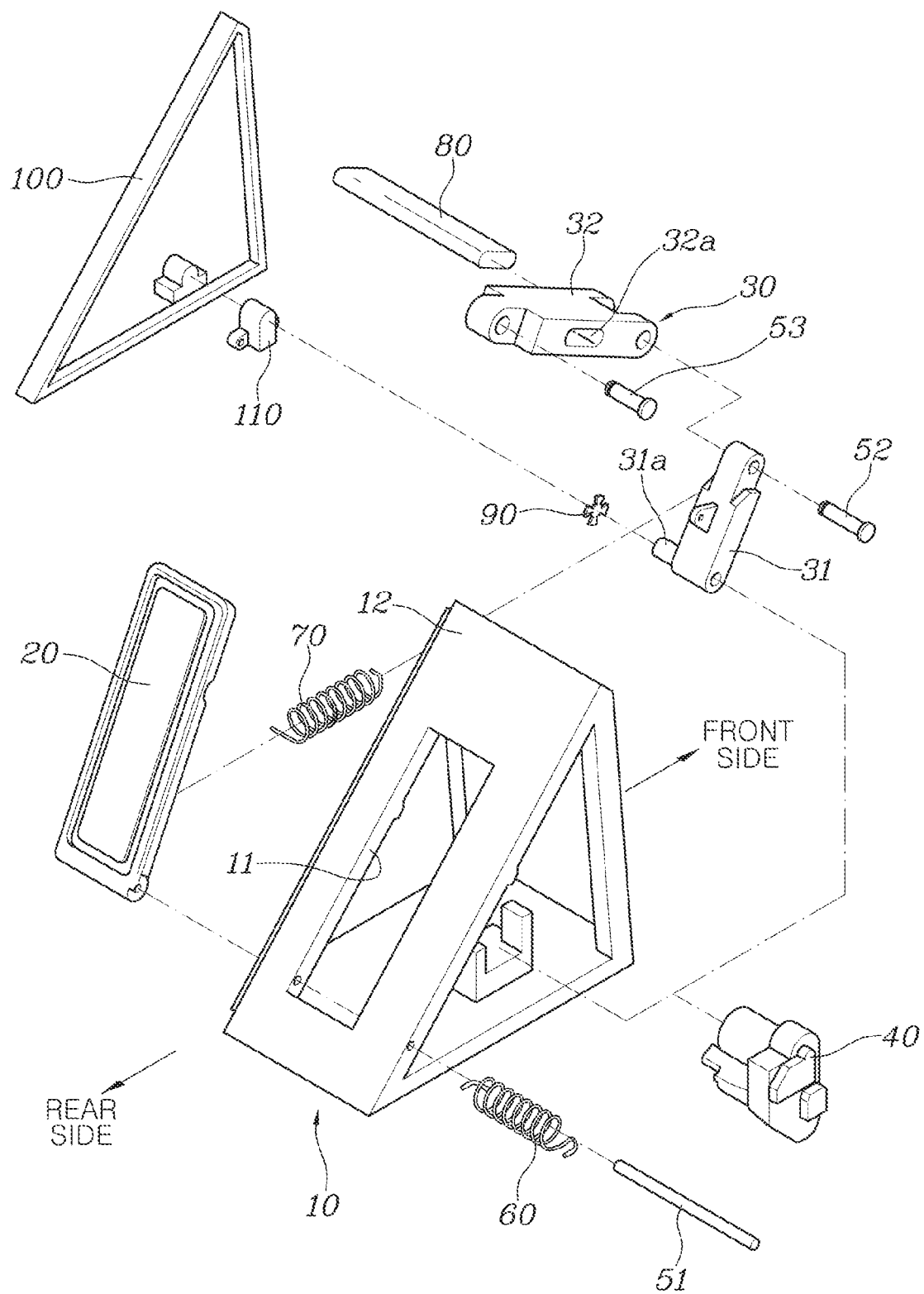
FIG. 1 is an exploded perspective view of an organ-type foldable pedal device for autonomous vehicles according to the present invention.
Figure 2:
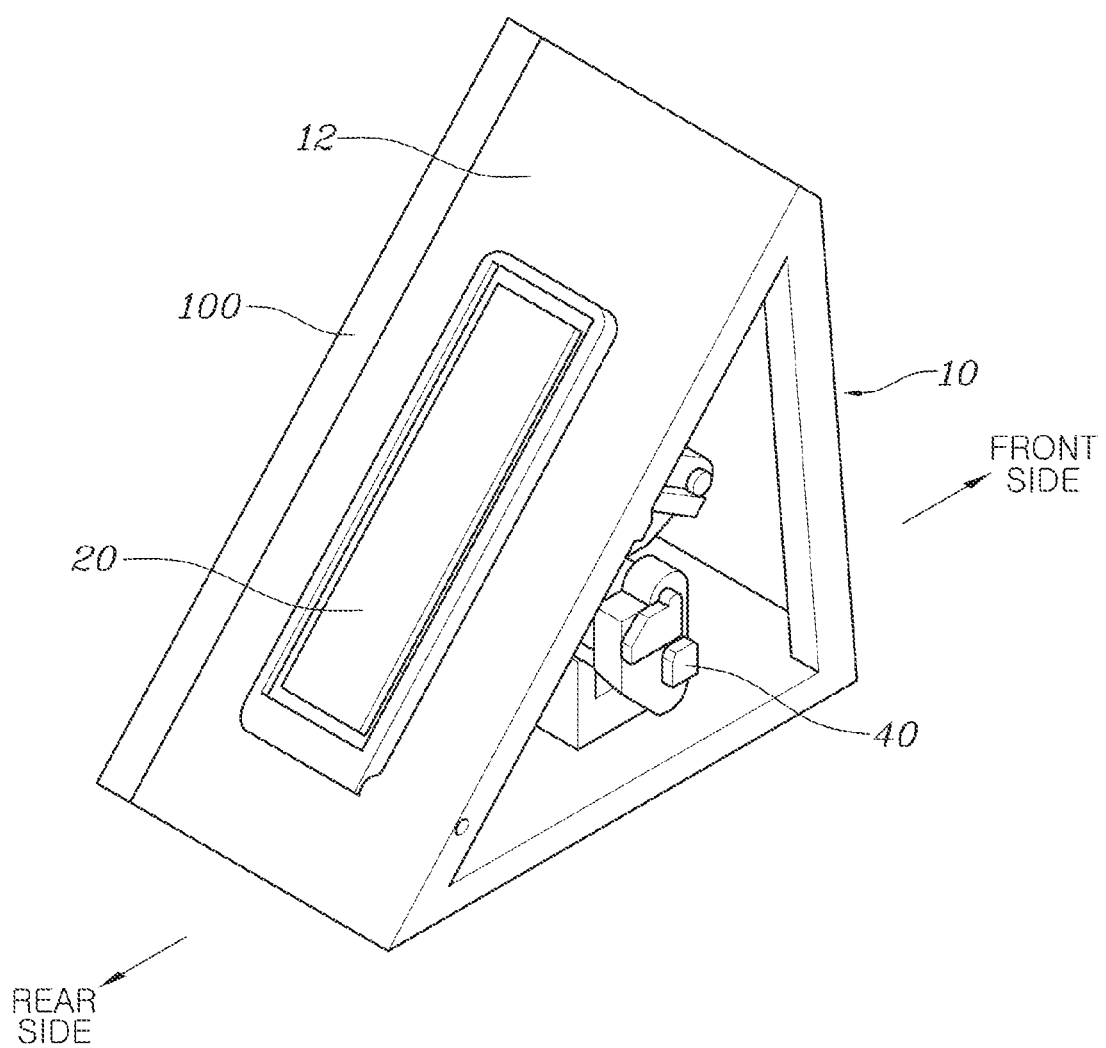
FIGS. 2 to 4 are views illustrating the hidden state in which a pedal pad is inserted into a pedal housing.
Figure 3:
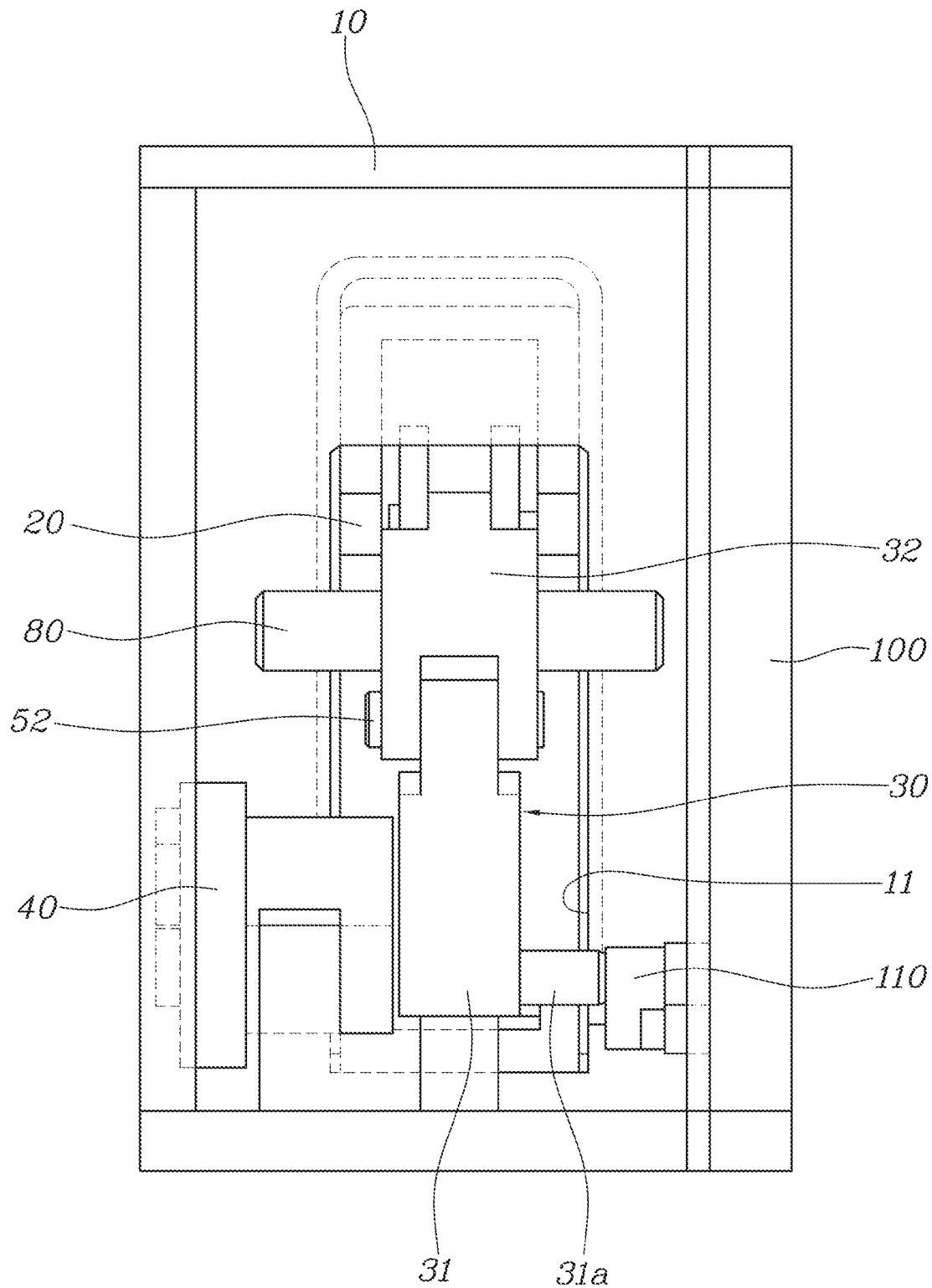
Figure 4:
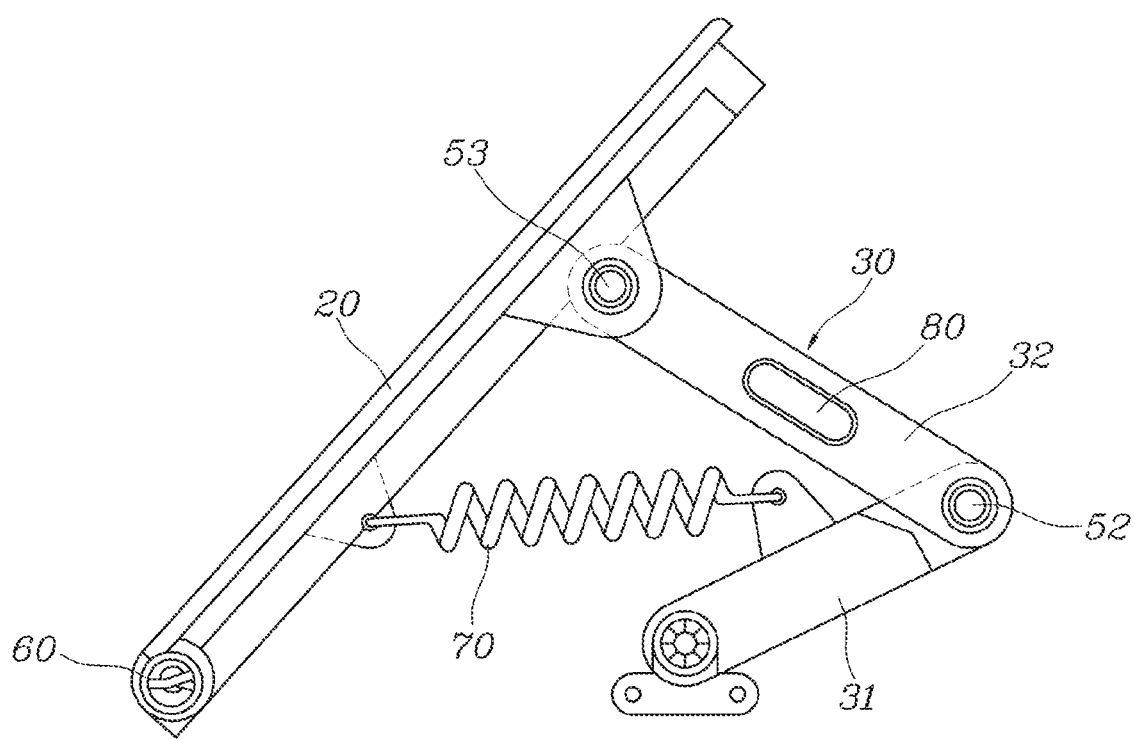
Figure 5:
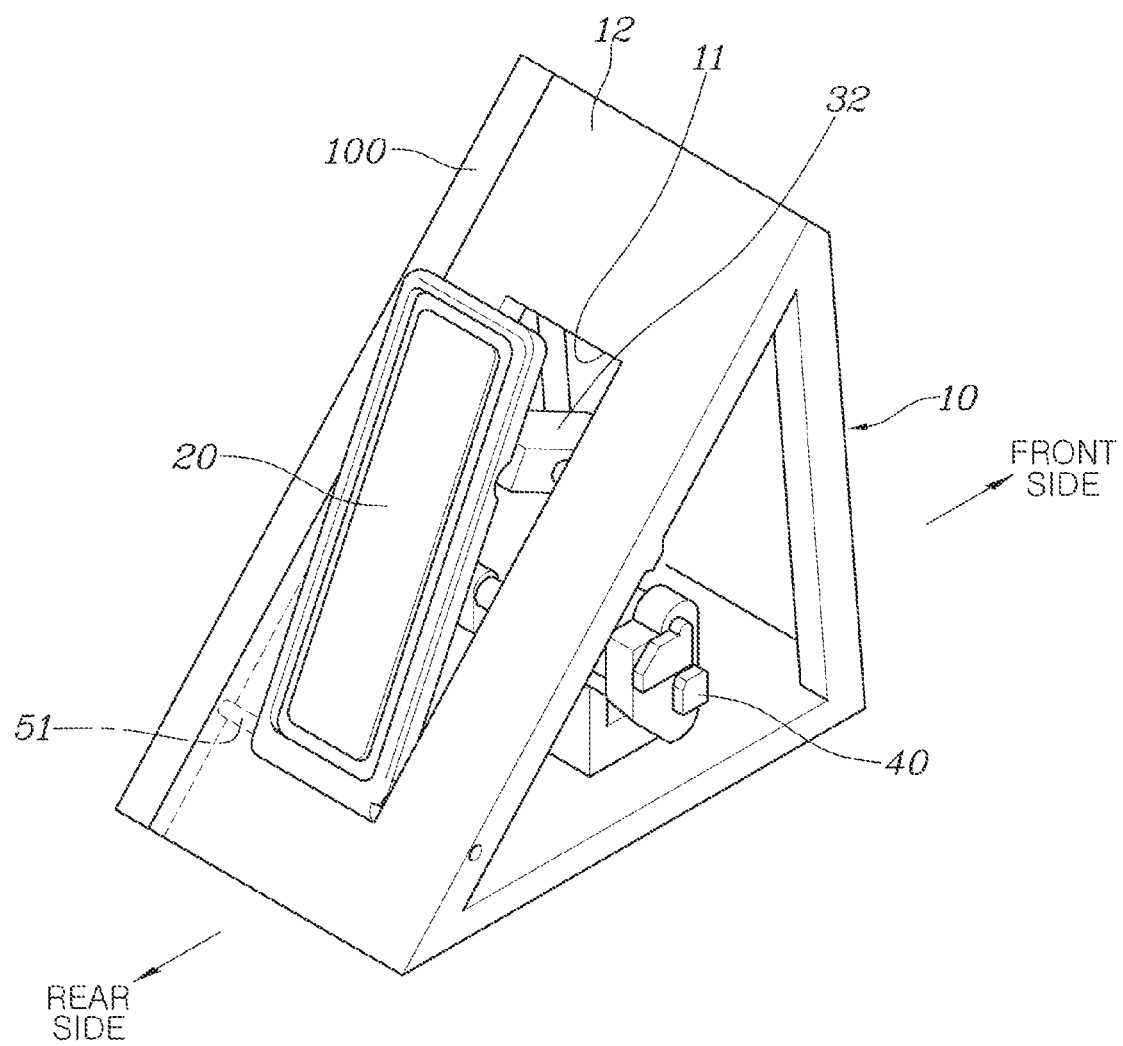
FIGS. 5 to 8 are views illustrating the state in which the pedal pad protrudes from the pedal housing.
Figure 6:
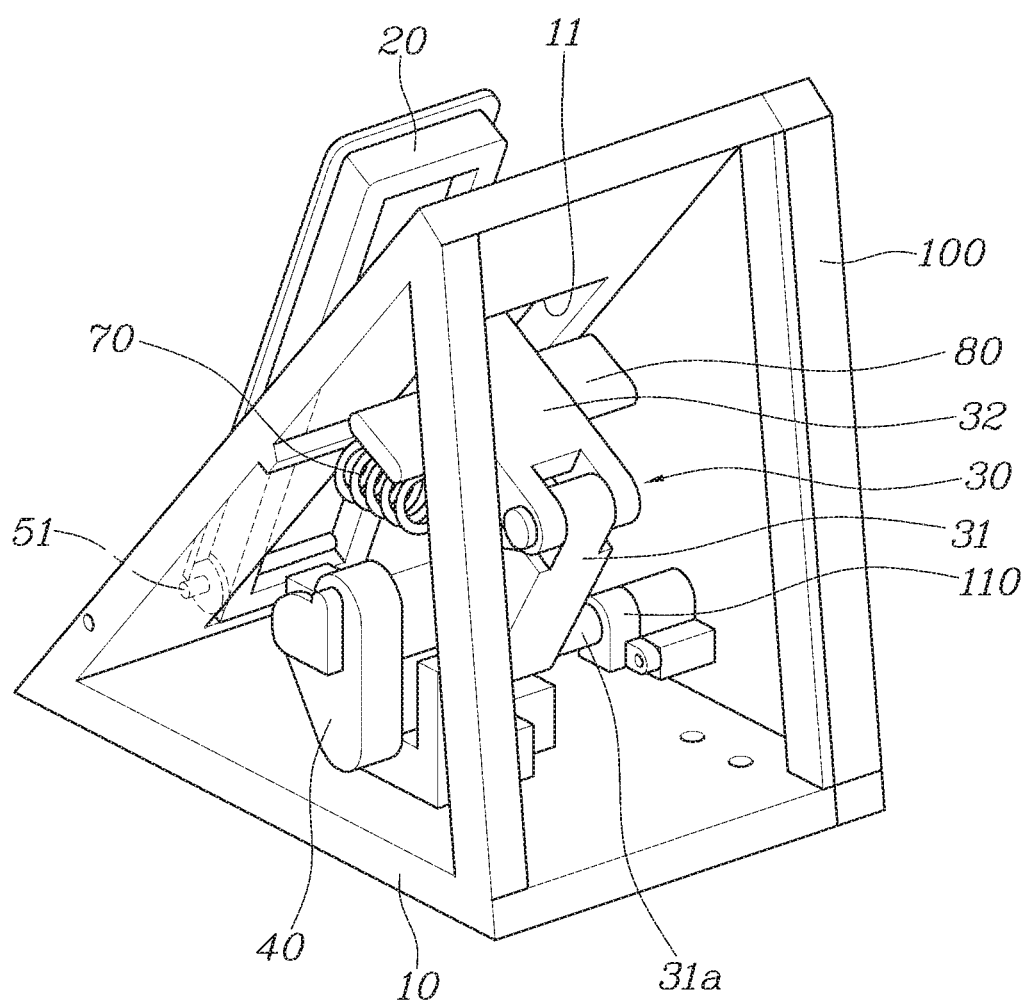
Figure 7:
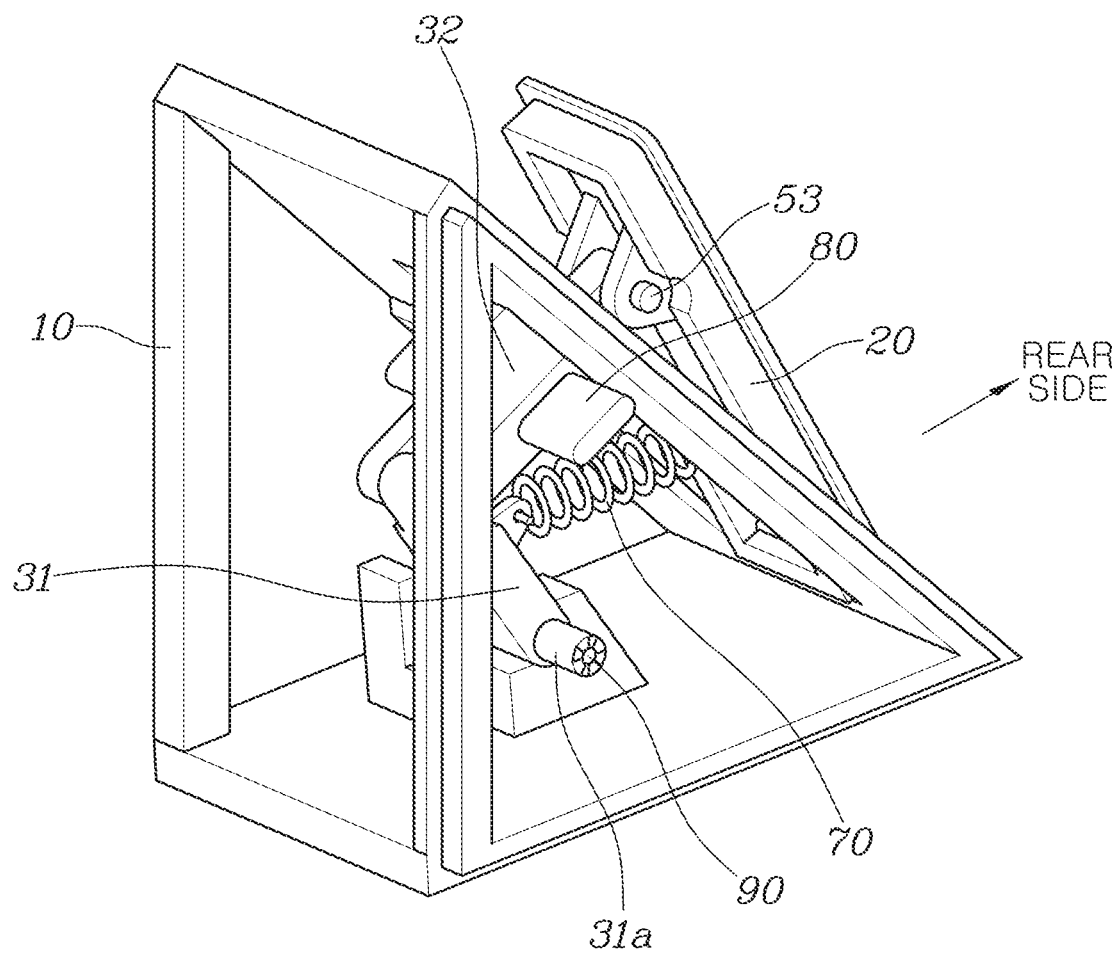
Figure 8:
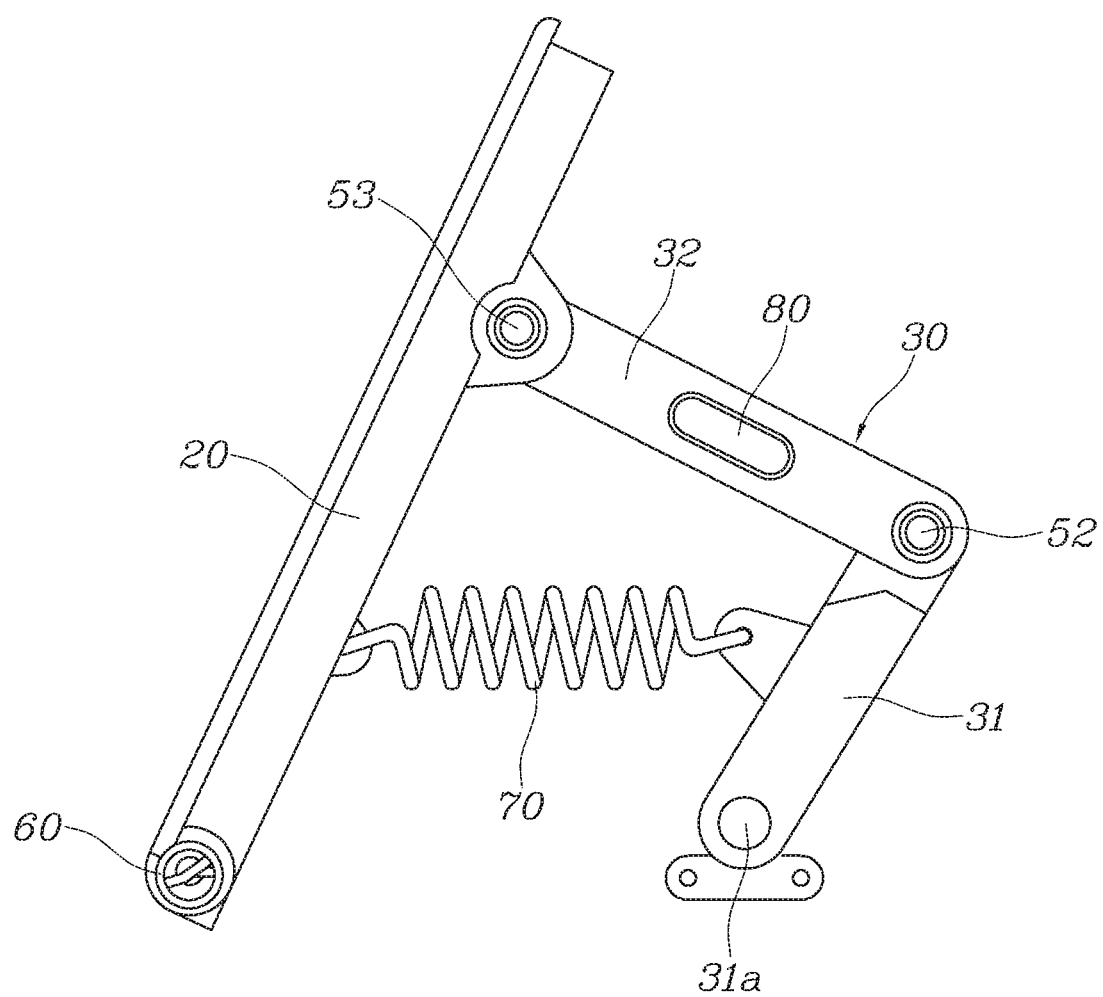

Hereinafter, an autonomous vehicle including a foldable accelerator pedal device and a foldable brake pedal device according to exemplary embodiments of the present invention will be described in detail with reference to the accompanying drawings.

FIGS. 1 to 9 illustrate an organ-type foldable pedal device. The organ-type foldable pedal device has a configuration that enables use thereof in autonomous vehicles. In particular, the organ-type foldable pedal device has a configuration such that it is capable of being used both as an organ-type foldable accelerator pedal device and as an organ-type foldable brake pedal device.

As illustrated, the organ-type foldable pedal device includes a pedal housing 10, which is fixedly installed in the space below a driver's seat 121 and has a housing hole 11 formed in a rear portion thereof that is oriented toward a driver, a pedal pad 20, which is located in the housing hole 11 and is rotatably hinged at the lower end thereof to the pedal housing 10, a pedal link 30, which connects the pedal housing 10 and the pedal pad 20 to each other, and an actuator 40, which is secured to the pedal housing 10 and is connected to the pedal link 30, the actuator 40 being configured to generate power to rotate the pedal link 30.

The pedal housing 10 has an external appearance that is formed in a triangular shape such that the front surface thereof is secured to a dash panel, which constitutes the vehicle body, such that the bottom surface thereof is secured to a floor panel, which constitutes the vehicle body, in the space below the driver's seat, and such that the interior thereof is empty.

The front surface and the bottom surface of the pedal housing 10 are disposed so as to be perpendicular to each other. The rear surface 12, which is oriented toward the driver, is disposed at an incline. The housing hole 11, in which the pedal pad 20 is mounted, is formed in the rear surface 12, which is oriented toward the driver.

The pedal pad 20 is located in the housing hole 11 in the pedal housing 10. The lower end of the pedal pad 20 receives a hinge pin 51 inserted therethrough. The two opposite ends of the hinge pin 51 penetrate the pedal housing 10 and are secured to the pedal housing 10.

Thus, the upper end of the pedal pad 20 is rotatable in the forward-backward direction about the hinge pin 51 located in the lower end thereof. When the upper end of the pedal pad 20 rotates forwards, the pedal pad 20 is inserted into the housing hole 11 in the pedal housing 10, and thus seals the housing hole 11. When the upper end of the pedal pad 20 rotates backwards, the pedal pad 20 protrudes backwards toward the driver from the housing hole 11 in the pedal housing 10.

The actuator 40 may be configured as a motor.

The embodiment according to the present invention further includes a main spring 60, which is wound around the hinge pin 51 and is secured at the two opposite ends thereof to the pedal pad 20 and the hinge pin 51, and a sub-spring 70, which connects the pedal pad 20 and the pedal link 30 to each other.

The main spring 60 may be a torsion spring, which is compressed and accumulates elastic force when the pedal pad 20 rotates backwards to protrude toward the driver from the pedal housing 10 and which is restored in shape by releasing the accumulated elastic force when the pedal pad 20 rotates forwards to seal the housing hole 11. That is, by the elastic force of the main spring 60, the pedal pad 20 receives a force to rotate in a direction to close the housing hole 11. However, the present invention is not limited thereto.

The sub-spring 70 may be a compressive coil spring, which is compressed and accumulates elastic force when the pedal pad 20 rotates forward to seal the housing hole 11 and which is restored when the pedal pad 20 rotates backwards to protrude toward the driver from the pedal housing 10. That is, by the elastic force of the sub-spring 70, the pedal pad 20 receives a force to rotate to protrude rearward toward the driver from the pedal housing 10. However, the present invention is not limited thereto.

The embodiment according to the present invention is characterized in that the elastic force of the main spring 60 is greater than the elastic force of the sub-spring 70. Accordingly, when the actuator 40 is in the inactivated state, the pedal pad 20 is rotated forwards by the elastic force of the main spring 60, and is located in the housing hole 11.

When the pedal pad 20 is in the state of protruding backwards toward the driver from the pedal housing 10, that is, in the state in which the pedal pad 20 pops up, if the driver steps on the pedal pad 20, the elastic force of the sub-spring 70 act as reaction force, thus generating pedal force.

Even when no sub-spring is provided, it is possible to generate a sufficient amount of pedal force using only the elastic force of the main spring 60. However, in order to enable the pedal force to be accurately set, it is preferable that both the main spring 60 and the sub-spring 70 be provided.

The embodiment according to the present invention further includes a stopper 80, which is coupled to the pedal link 30 and controls the backward rotation angle of the pedal pad 20 through contact with the pedal housing 10 when the pedal pad 20 rotates backwards to protrude toward the driver from the pedal housing 10, a permanent magnet 90, which is secured to a link shaft 31a by which the pedal link 30 is rotatably coupled to the pedal housing 10, and a non-contact pedal sensor 110, which is mounted on a side cover 100 coupled to the pedal housing 10 so as to be opposite the permanent magnet 90 and detects the rotation angle of the pedal pad 20 through a change in the intensity of a magnetic field depending on a change in the rotational position of the permanent magnet 90 during rotation of the pedal link 30.

When the pedal pad 20 rotates backwards to protrude toward the driver from the pedal housing 10, the stopper 80 coupled to the pedal link 30 comes into contact with the inner surface of the rear surface 12 of the pedal housing 10, thereby restricting the backward rotation angle of the pedal pad 20. The stopper 80 may be made of any one of rubber, silicon, and synthetic resin in order to prevent the occurrence of noise when contacting the pedal housing 10. However, the present invention is not limited thereto.

The pedal sensor 110 includes a printed circuit board (PCB). With the configuration in which the permanent magnet 90 is located on the link shaft 31a, which serves as the center of rotation of the pedal link 30, it is possible to further increase the accuracy of a signal output from the pedal sensor 110.

The pedal link 30 according to the present invention includes a rotation link 31, which is provided with the link shaft 31*a* rotatably coupled to the pedal housing 10 and is connected to the actuator 40 so as to receive power therefrom, and a connection link 32, which is rotatably hinged at the two opposite ends thereof to the rotation link 31 and the pedal pad 20 in order to connect the rotation link 31 and the pedal pad 20 to each other.

The rotation link 31 is provided at the lower end thereof with the link shaft 31*a*. The link shaft 31*a* is rotatably coupled to the lower surface of the pedal housing 10. The rotation link 31 is connected to the actuator 40 so as to be rotated by the power from the actuator 40.

The upper end of the rotation link 31 is rotatably coupled to the rear end of the connection link 32 via a first pin 52, and the front end of the connection link 32 is rotatably coupled to the pedal pad 20 via a second pin 53.

According to the present invention, the angle formed by the rotation link 31 and the connection link 32 is maintained at an acute angle at all times regardless of rotation of the pedal pad 20. When the pedal pad 20 rotates backwards to protrude toward the driver from the pedal housing 10, if the rotation link 31 and the connection link 32 form an obtuse angle therebetween, the pedal pad 20 protrudes excessively far backwards, which causes a problem in which the driver is not capable of accurately stepping on the pedal pad 20. In order to prevent this problem, it is preferable that the angle formed by the rotation link 31 and the connection link 32 be maintained at an acute angle at all times regardless of rotation of the pedal pad 20.

According to the present invention, one end of the sub-spring 70, which is connected to the pedal pad 20, is coupled to the rotation link 31. The permanent magnet 90 is secured to an end portion of the link shaft 31*a* of the rotation link 31. The connection link 32 has a stopper hole 32*a* formed therein, into which the stopper 80, which controls the backward rotation angle of the pedal pad 20 through contact with the pedal housing 10, is inserted.

When the driver selects the autonomous driving mode, the upper end of the pedal pad 20 is rotated forwards about the hinge pin 51 provided at the lower end thereof by the driving force of the actuator 40 in a first rotational direction thereof and the elastic force of the main spring 60. The pedal pad 20 is thus inserted into the housing hole 11 in the pedal housing 10 and seals the housing hole 11. In this case, the pedal pad 20 lies in the same plane as the rear surface 12 of the pedal housing 10, and thus the pedal pad 20 is hidden (refer to FIGS. 2 to 4).

When the pedal pad 20 is in a hidden state, in which the pedal pad 20 is inserted into the housing hole 11 in the pedal housing 10, the space below the driver's seat becomes a broad space in which no pedal is present. Thus, the driver is capable of taking a comfortable rest in the relaxation mode.

In addition, when the pedal pad 20 is in the hidden state, in which the pedal pad 20 is inserted into the housing hole 11 in the pedal housing 10, since the pedals are not exposed in the space below the driver's seat, it is possible to prevent erroneous operation of the pedals by the driver in the autonomous driving situation.

When the driver selects the manual driving mode, in which the driver manually drives the vehicle, the upper end of the pedal pad 20 is rotated backwards toward the driver about the hinge pin 51 provided at the lower end thereof by the driving force of the actuator 40 in a second rotational direction thereof, the rotation of the pedal link 30, and the deformation of the spring. Thus, the pedal pad 20 pops up, that is, protrudes from the housing hole 11 in the pedal housing 10 (refer to FIGS. 5 to 8).

When the pedal pad 20 is in a pop-up state, in which the pedal pad 20 rotates backwards and protrudes toward the driver from the pedal housing 10, the driver operates the pedal pad 20 with the foot to control acceleration or brake required for driving of the vehicle.

In the state in which the pedal pad 20 pops up, if the driver steps on the pedal pad 20, the elastic force of the sub-spring 70 acts as reaction force, thus generating pedal force.

Figure 9:
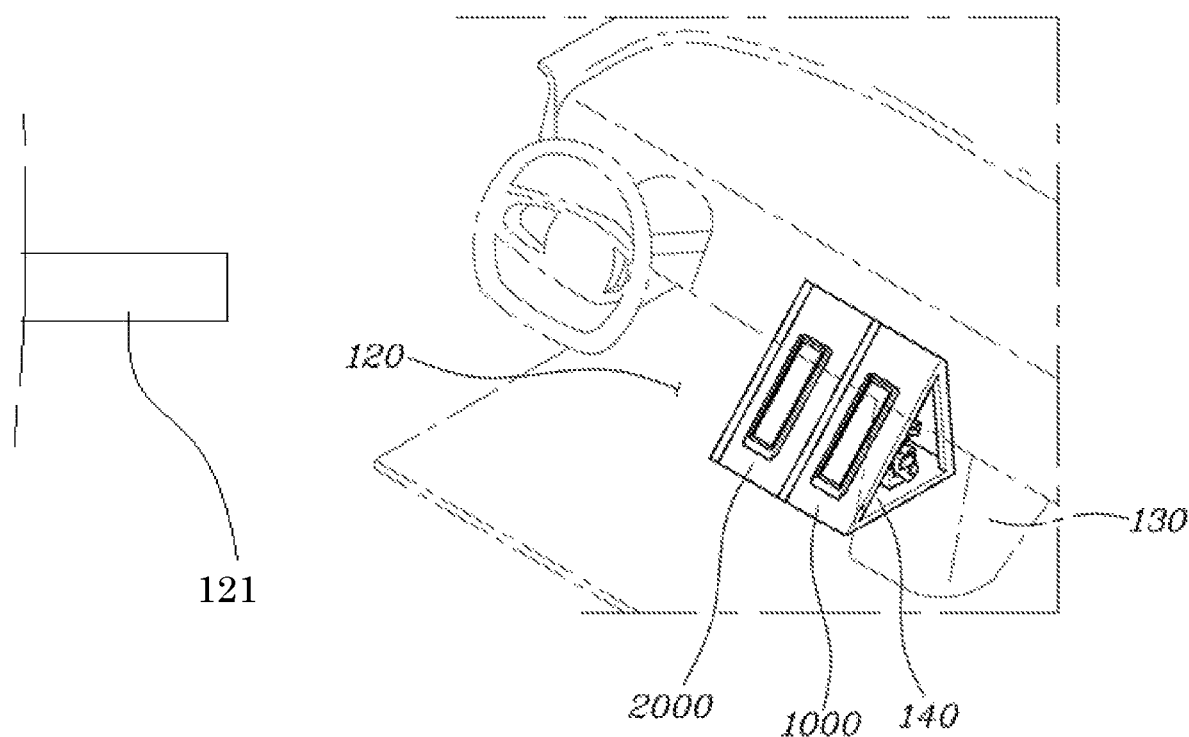
FIG. 9 is a view illustrating the configuration in which an organ-type foldable accelerator pedal device and an organ-type foldable brake pedal device according to the present invention are combined into one group and are mounted in the space below the driver's seat.
Figure 10:
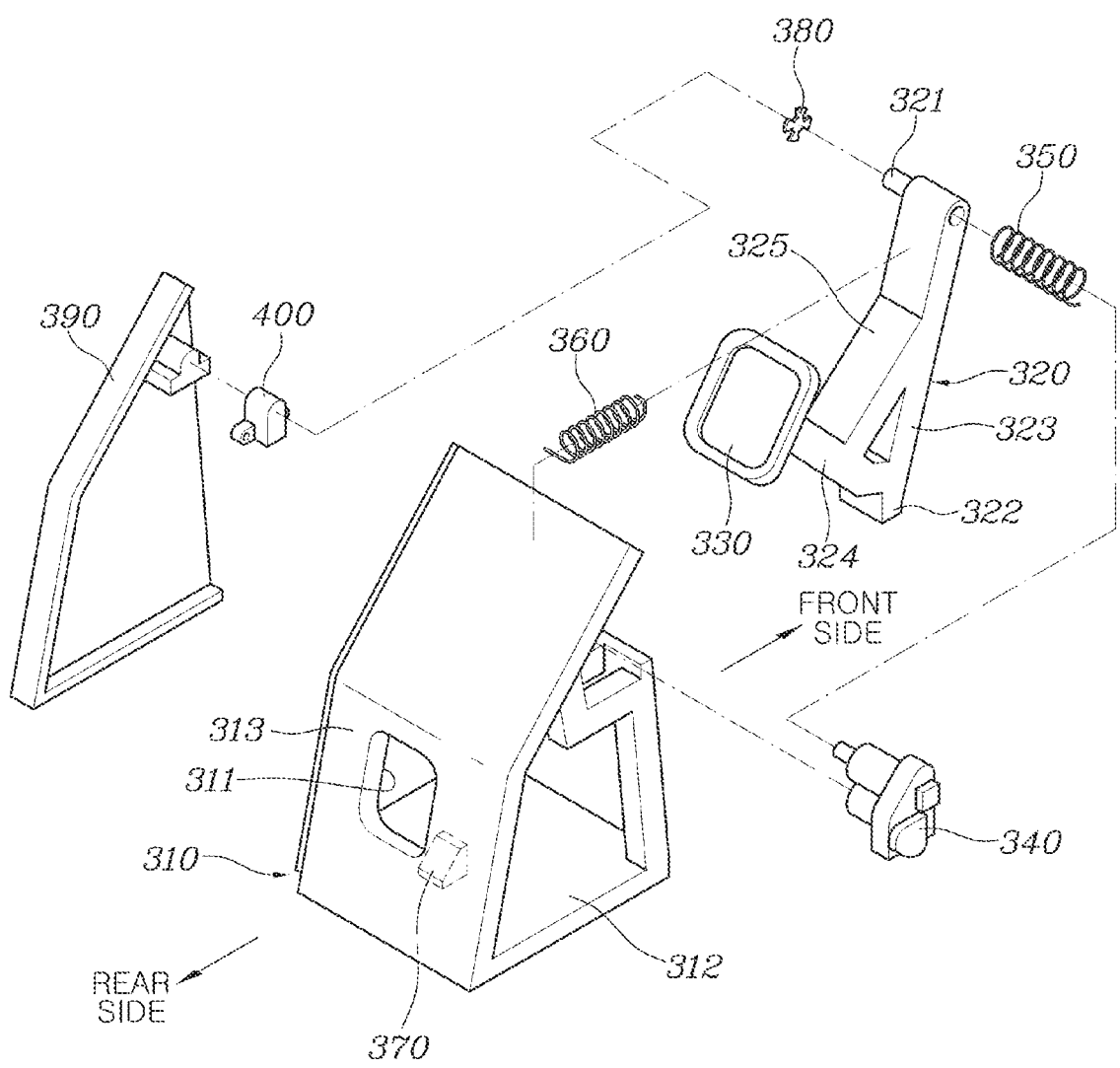
FIG. 10 is an exploded perspective view of a pendant-type foldable pedal device for autonomous vehicles according to the present invention.
Figure 11:
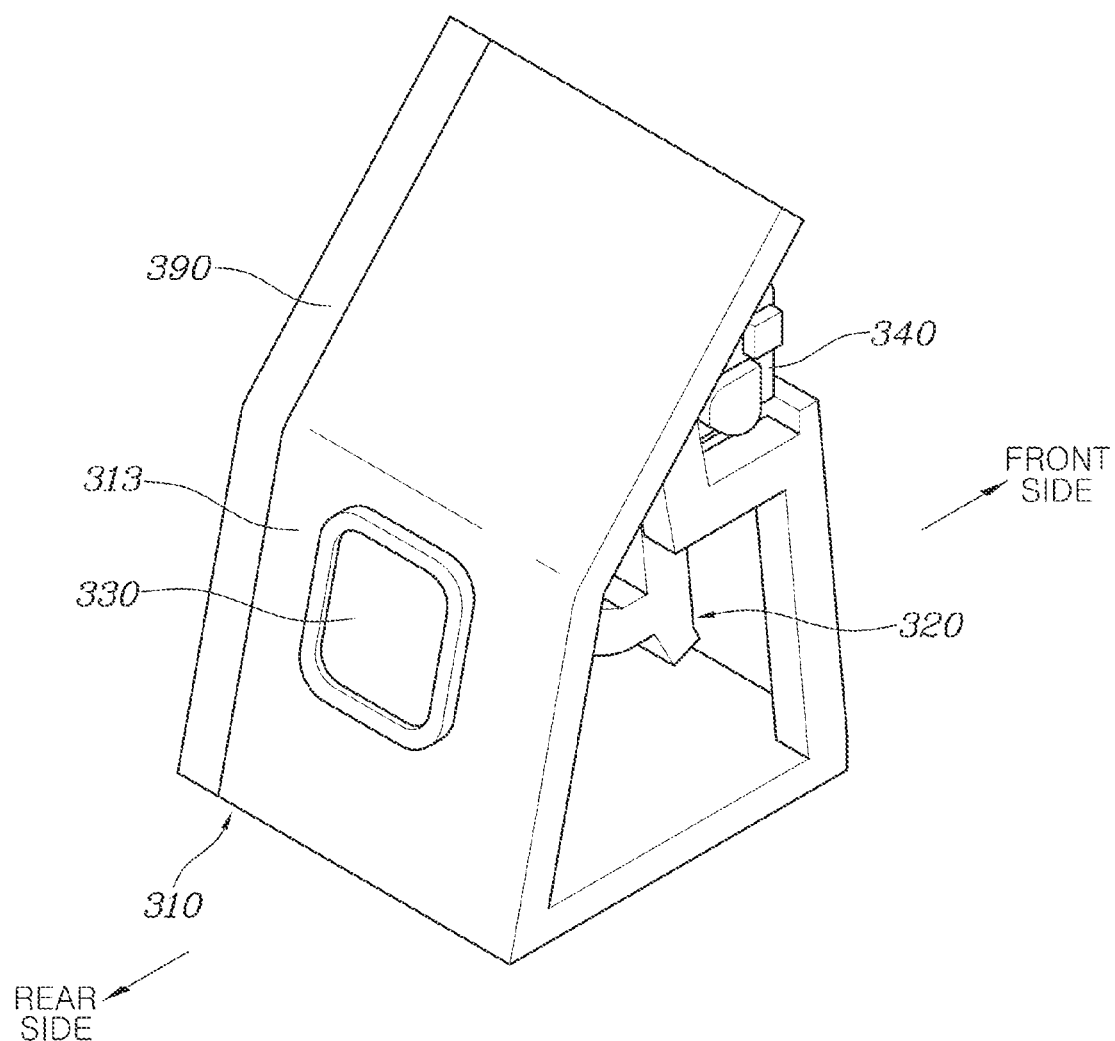
FIGS. 11 to 13 are a perspective view, a rear view, and a side view illustrating the coupled state of FIG. 10 and the hidden state in which a pedal pad is inserted into a pedal housing.
Figure 12:
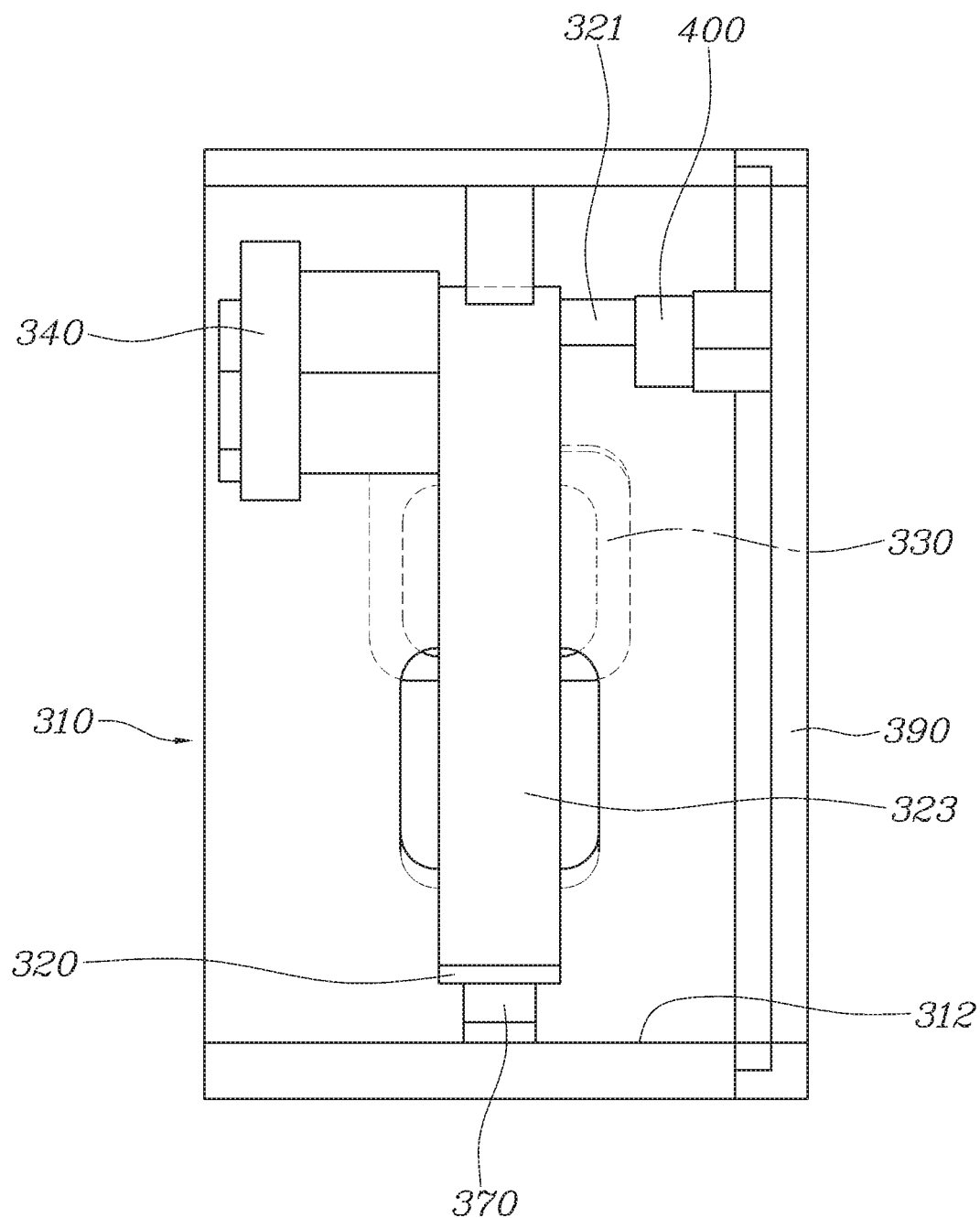
Figure 13:
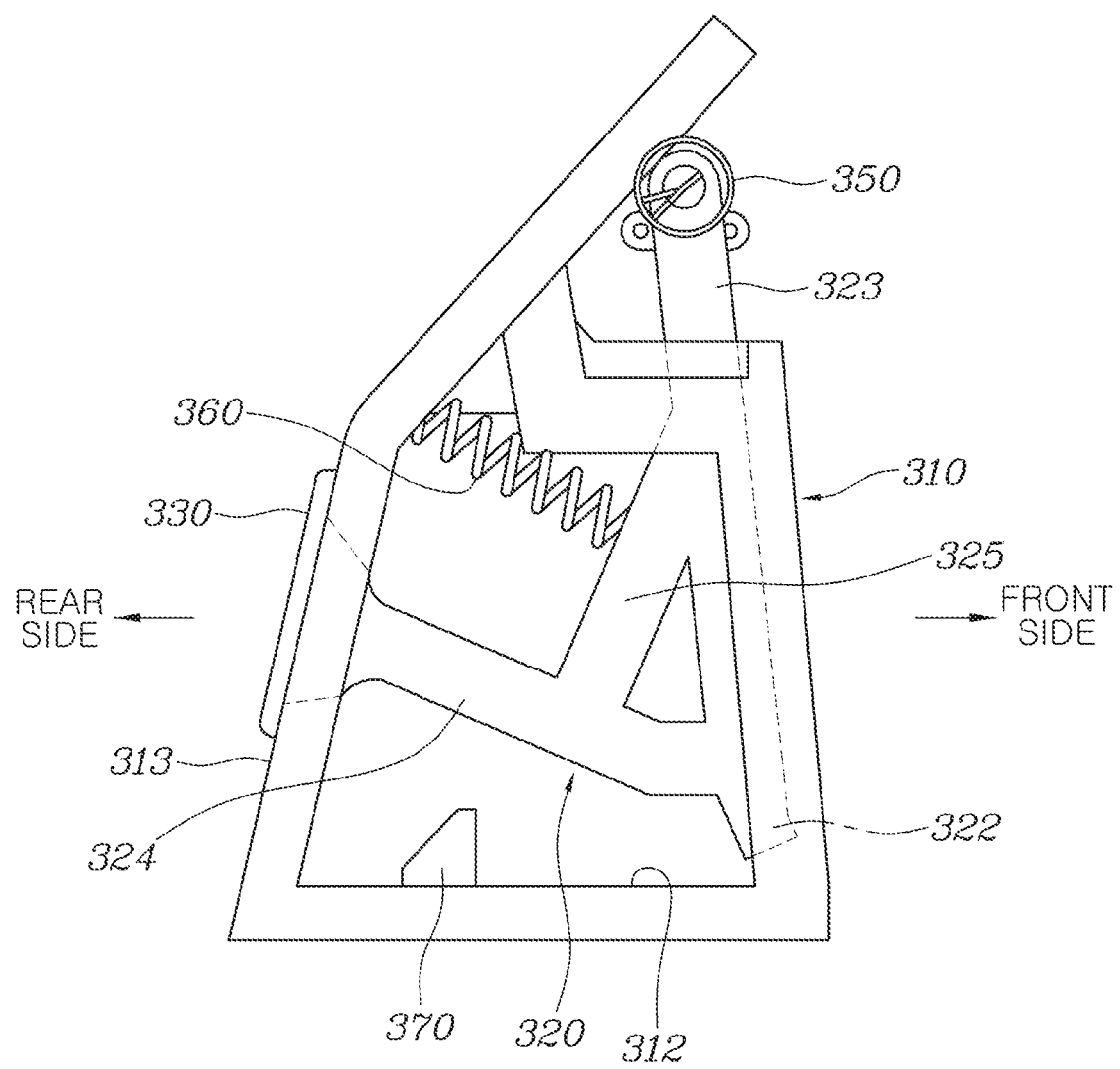
Figure 14:
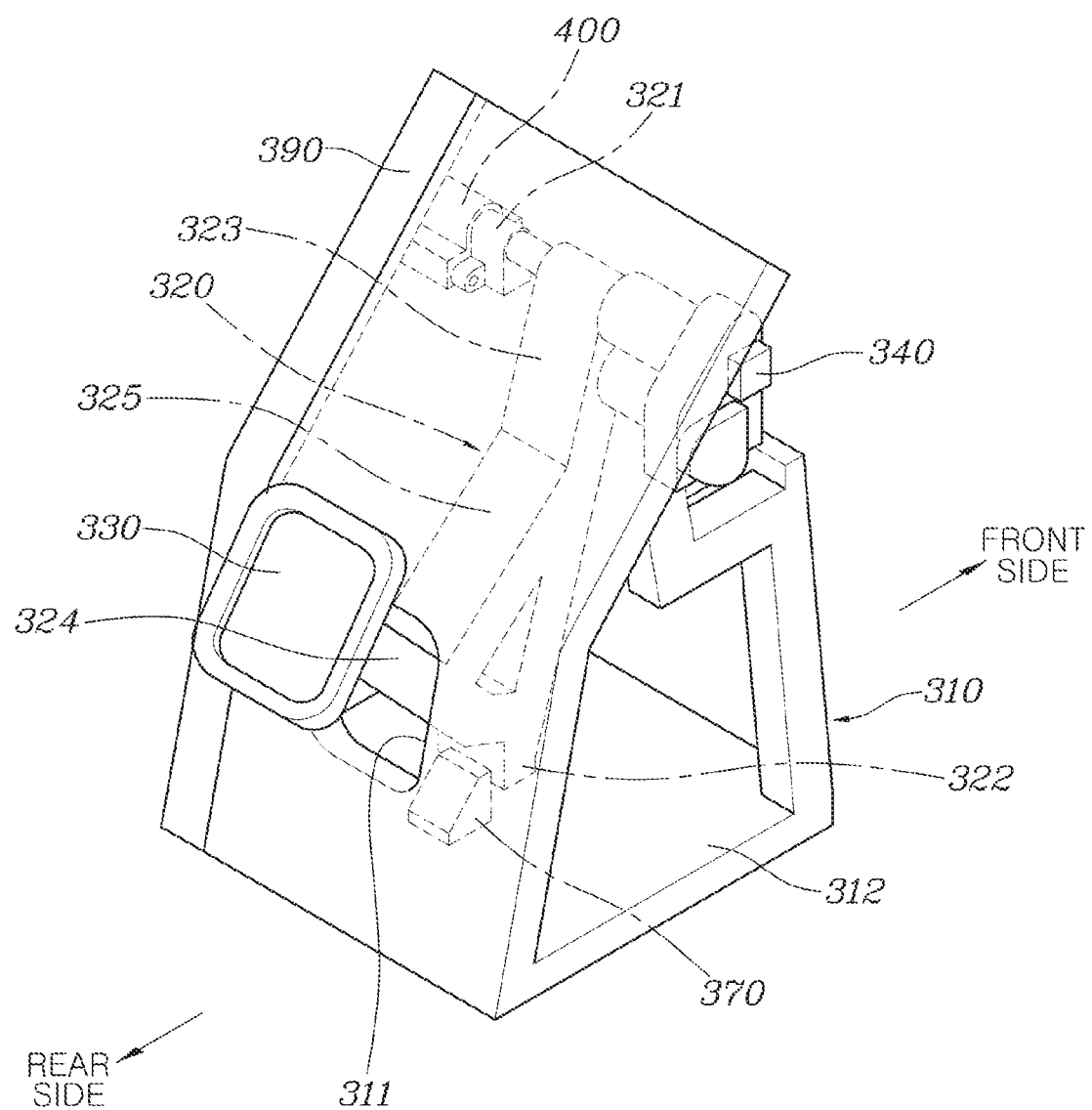
FIGS. 14 to 17 are a perspective view and a side view illustrating the state in which the pedal pad protrudes from the pedal housing.
Figure 15:
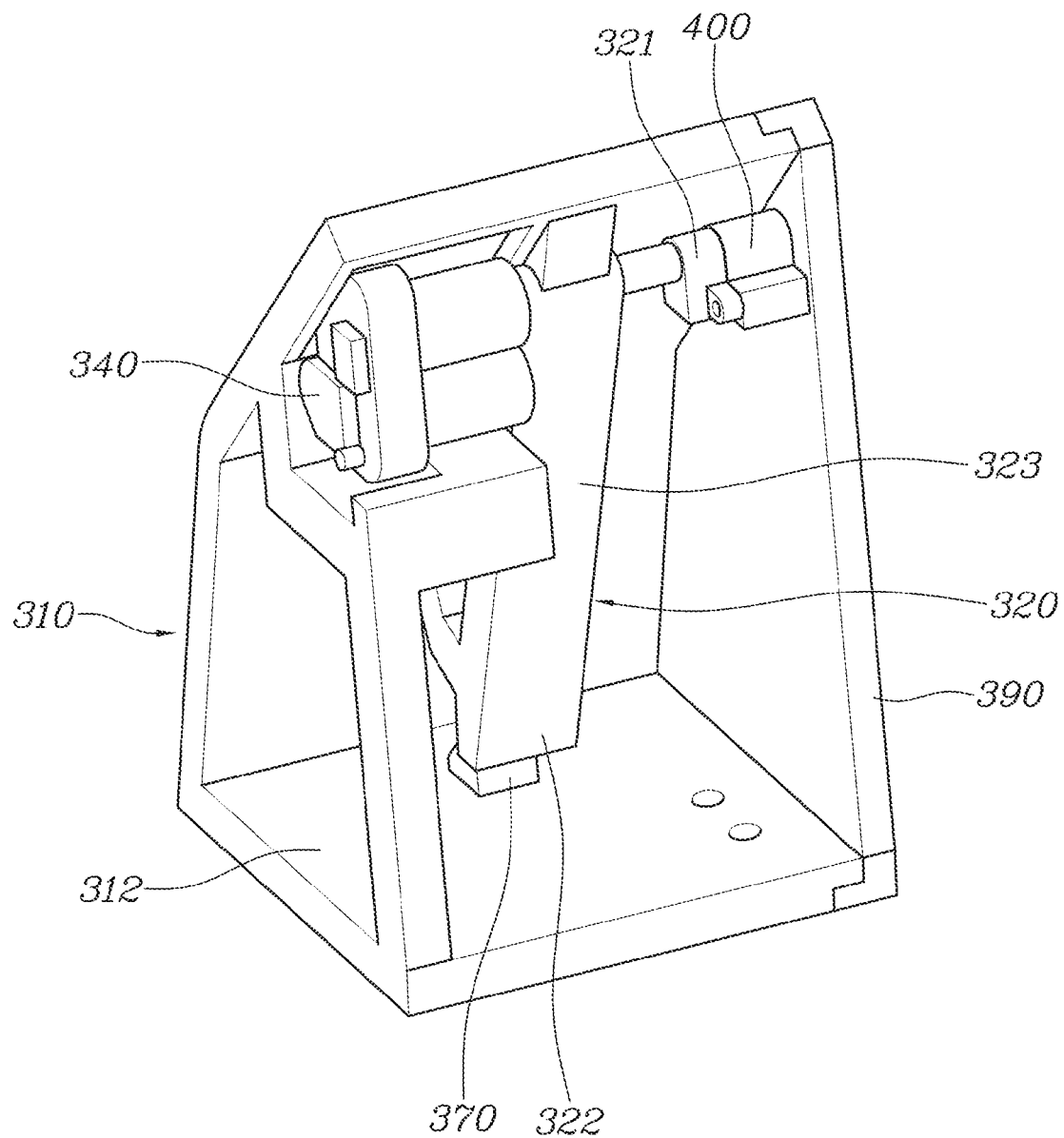
Figure 16:
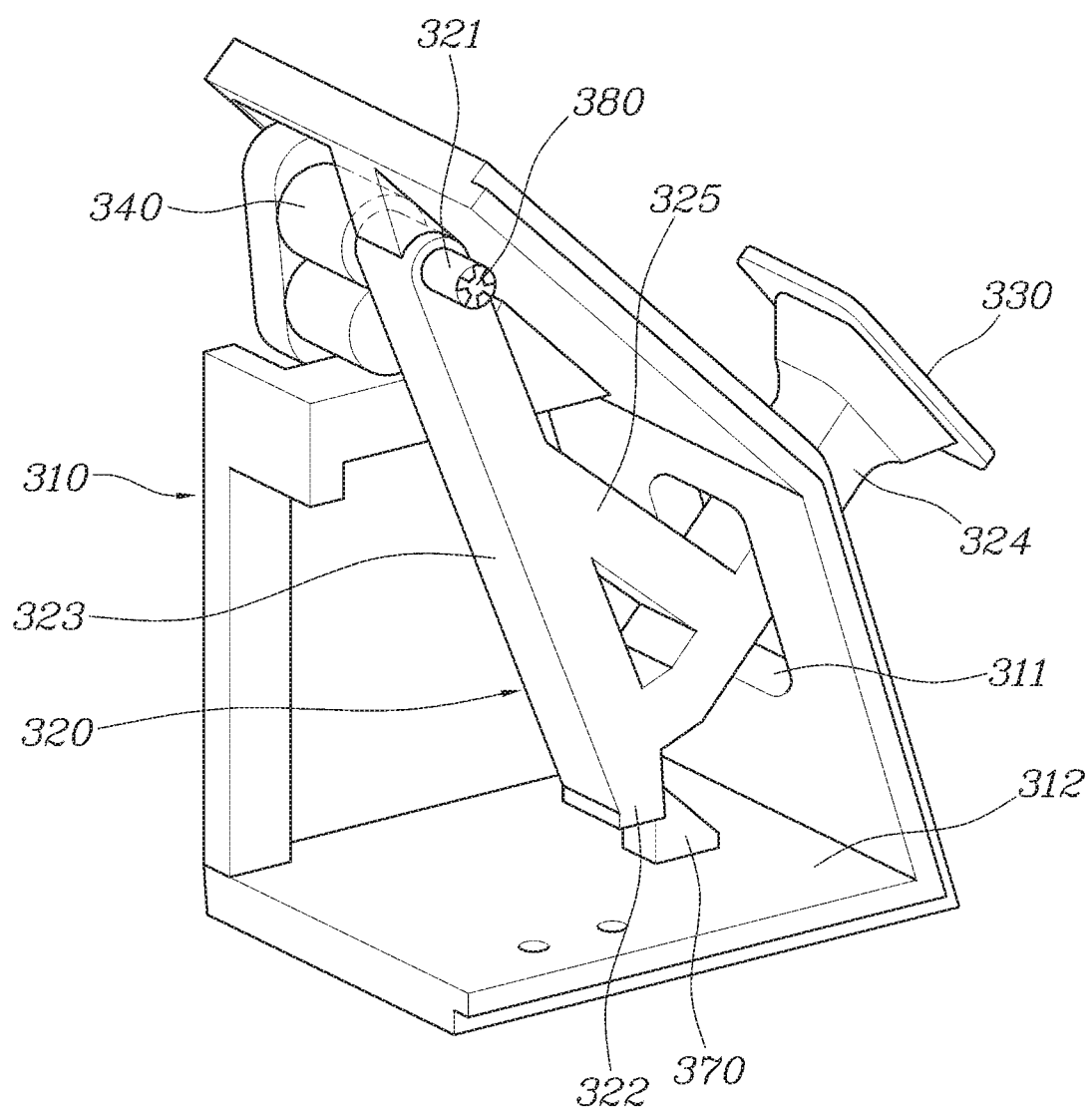
Figure 17:
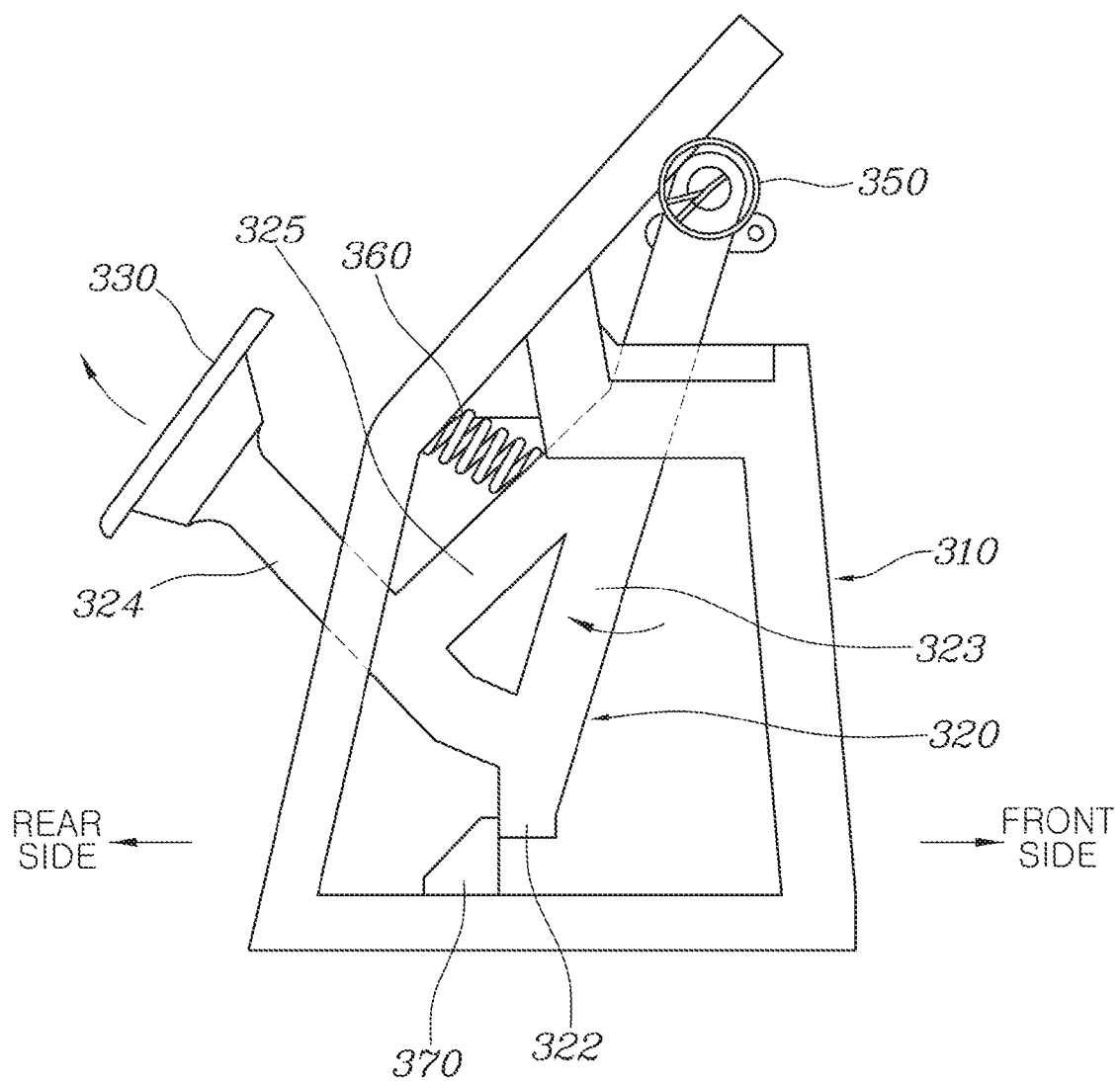

Meanwhile, as shown in FIG. 9, the organ-type foldable pedal device according to the embodiment of the present invention may be used both as an organ-type foldable accelerator pedal device 1000 and as an organ-type foldable brake pedal device 2000 in one autonomous vehicle.

As described above, in the case in which the organ-type foldable pedal device according to the present invention is used both as the organ-type foldable accelerator pedal device 1000 and as the organ-type foldable brake pedal device 2000 in one autonomous vehicle, the organ-type foldable accelerator pedal device 1000 is mounted so as to be in close contact with the side surface of a console 130 in a space 120 below the driver's seat, and the organ-type foldable brake pedal device 2000 is mounted so as to be in close contact with one side surface of the organ-type foldable accelerator pedal device 1000.

In this case, the side surface of the pedal housing 10 of the organ-type foldable accelerator pedal device 1000, which closely contacts the console 130, has an open structure 140 without the side cover 100. However, the open structure 140 is shielded by the console 130, and thus is not exposed to the outside, thereby preventing introduction of foreign substances and reducing the weight and manufacturing costs of the product.

In addition, each of the opposite side surface of the organ-type foldable accelerator pedal device 1000, which closely contacts the organ-type foldable brake pedal device 2000, and the two opposite side surfaces of the organ-type foldable brake pedal device 2000 has a structure that is sealed by the side cover 100, thereby securing a sufficient amount of strength and rigidity, avoiding exposure to the outside, and preventing introduction of foreign substances.

FIGS. 10 to 18 illustrate a pendant-type foldable pedal device. The pendant-type foldable pedal device has a configuration that enables use thereof in autonomous vehicles. In particular, the pendant-type foldable pedal device has a configuration such that it is capable of being used both as a pendant-type foldable accelerator pedal device and as a pendant-type foldable brake pedal device.

As illustrated, the pendant-type foldable pedal device includes a pedal housing 310, which is fixedly installed in the space below the driver's seat and has a housing hole 311 formed in a rear portion thereof that is oriented toward the driver, a pedal arm 320, which is hinged to the pedal housing 310 so as to be rotatable in the forward-backward direction, a pedal pad 330, which is provided at the pedal arm 320 and is configured to seal the housing hole 311 when the pedal arm 320 rotates forwards and to protrude backwards toward the driver from the pedal housing 310 when the pedal arm 320 rotates backwards, and an actuator 340, which is secured to the pedal housing 310 and is connected to the pedal arm 320, the actuator 340 being configured to generate power to rotate the pedal arm 320.

The pedal housing 310 has an external appearance that is formed in a schematically rectangular box shape such that the rear surface thereof further protrudes upwards than the top surface thereof and is slanted forwards, such that the front surface thereof is secured to the dash panel, which constitutes the vehicle body, such that the bottom surface 312 thereof is secured to the floor panel, which constitutes the vehicle body, in the space below the driver's seat, and such that the interior thereof is empty.

The front surface and the bottom surface 312 of the pedal housing 10 are disposed so as to be perpendicular to each other. The rear surface 313, which is oriented toward the driver, is disposed at an incline. The housing hole 311, in which the pedal pad 330 is mounted, is formed in the rear surface 313, which is oriented toward the driver.

Although the housing hole 311 is illustrated as being a rectangular-shaped hole, it may be formed in any of various shapes other than the rectangular shape.

The pedal arm 320 is located in the internal space of the pedal housing 310. The upper end of the pedal arm 320 is hinged to the pedal housing 310 to serve as the center of rotation of the pedal arm 320, and the lower end of the pedal arm 320 rotates in the forward-backward direction about the upper end thereof.

The pedal pad 330 is located outside the rear surface 313 of the pedal housing 310. The pedal arm 320 passes through the housing hole 311 formed in the rear surface 313 of the pedal housing 310, and is connected to the pedal pad 330.

The pedal pad 330 may be integrally formed with the pedal arm 320. Alternatively, the pedal arm 320 and the pedal pad 330 may be manufactured separately from each other, and may then be coupled to each other by a coupling member.

When the lower end of the pedal arm 320 rotates backwards about the upper end thereof, which is hinged to the pedal housing 310, the pedal pad 330 protrudes backwards toward the driver from the housing hole 311 in the pedal housing 310. In the state in which the pedal pad 330 protrudes backwards from the pedal housing 310, when the pedal arm 320 rotates forwards, the pedal pad 330 protruding backwards moves toward the rear surface 313 of the pedal housing 310, and seals the housing hole 311 formed in the rear surface 313.

The actuator 340 may be configured as a motor.

The embodiment of the present invention further includes an operating force spring 350, which is located at the position corresponding to the center of rotation of the pedal arm 320 and is secured at the two opposite ends thereof to the pedal housing 310 and the pedal arm 320, and a return spring 360, which extends in the forward-backward direction and is secured at the two opposite ends thereof to a body portion of the pedal arm 320 and the pedal housing 310.

The operating force spring 350 may be a torsion spring, which is compressed and accumulates elastic force when the pedal arm 320 rotates forwards such that the pedal pad 330 seals the housing hole 311 and which is restored in shape by releasing the accumulated elastic force when the pedal arm 320 rotates backwards such that the pedal pad 330 protrudes toward the driver from the pedal housing 310. However, the present invention is not limited thereto.

The return spring 360 may be a compressive coil spring, which is compressed and accumulates elastic force when the pedal arm 320 rotates backwards such that the pedal pad 330 protrudes toward the driver from the pedal housing 310 and which is restored in shape by releasing the accumulated elastic force when the pedal arm 320 rotates forwards such that the pedal pad 330 seals the housing hole 311. However, the present invention is not limited thereto.

The embodiment according to the present invention is characterized in that the elastic force of the return spring 360 is greater than the elastic force of the operating force spring 350. Accordingly, when the actuator 340 is in the inactivated state, the pedal arm 320 is rotated forwards by the elastic force of the return spring 360, and thus the pedal pad 330 closely contacts the rear surface 313 of the pedal housing 310 so as to seal the housing hole 311.

When the pedal pad 330 is in the state of protruding backwards toward the driver from the pedal housing 310, that is, in the state in which the pedal pad 330 pops up, if the driver steps on the pedal pad 330, both the elastic force of the operating force spring 350 and the elastic force of the return spring 360 act as reaction force, thus generating pedal force.

Even when no operating force spring is provided, it is possible to generate a sufficient amount of pedal force using only the elastic force of the return spring 360. However, in order to enable the pedal force to be accurately set, it is preferable that both the operating force spring 350 and the return spring 360 be provided.

The pedal arm 320 according to the present invention includes a vertical rod portion 323, which is provided at the upper end thereof with a pedal arm shaft 321 hinged to the pedal housing 310 and includes a stopper portion 322 formed at the lower end thereof and to which one end of the operating force spring 350 is coupled such that the operating force spring 350 is located adjacent to the pedal arm shaft 321, an inclined rod portion 324, one end of which is connected to the vertical rod portion 323 and the opposite end of which passes through the housing hole 311 and is connected to the pedal pad 330, and a connection rod portion 325, which connects the vertical rod portion 323 and the inclined rod portion 324 to each other and to which one end of the return spring 360 is coupled.

In addition, the present invention further includes a housing protrusion 370, which protrudes upwards from the bottom surface 312 of the pedal housing 310 in the internal space of the pedal housing 310, and a stopper portion 322, which is provided at the pedal arm 320 so as to contact the housing protrusion 370 when the pedal arm 320 rotates backwards.

According to the embodiment of the present invention, when the pedal arm 320 rotates backwards, the stopper portion 322 provided at the pedal arm 320 comes into contact with the housing protrusion 370 provided in the pedal housing 310, thereby controlling the backward rotation angle of the pedal arm 320.

Further, the pedal pad 330 according to the present invention is formed to have an area lager than the area of the housing hole 311 formed in the pedal housing 310. Thus, when the pedal arm 320 rotates forwards, the pedal pad 330 does not pass through the housing hole 311, but closely contacts the rear surface 313 of the pedal housing 310, thereby controlling the forward rotation angle of the pedal arm 320.

The housing protrusion 370 formed in the pedal housing 310 may be made of any one of rubber, silicon, and synthetic resin in order to prevent the occurrence of noise when contacting the stopper portion 322 of the pedal arm 320. However, the present invention is not limited thereto.

In addition, the embodiment according to the present invention further includes a permanent magnet 380, which is secured to the pedal arm shaft 321 by which the pedal arm 320 is rotatably coupled to the pedal housing 310, and a non-contact pedal sensor 400, which is mounted on a side cover 390 coupled to the pedal housing 310 so as to be opposite the permanent magnet 380 and detects the rotation angle of the pedal arm 320 through a change in the intensity of a magnetic field depending on a change in the rotational position of the permanent magnet 380 during rotation of the pedal arm 320.

The pedal sensor 400 includes a printed circuit board (PCB). With the configuration in which the permanent magnet 380 is located on the pedal arm shaft 321, which serves as the center of rotation of the pedal arm 320, it is possible to further increase the accuracy of a signal output from the pedal sensor 400.

When the driver selects the autonomous driving mode, the lower end of the pedal arm 320 is rotated forwards about the pedal arm shaft 321 provided at the upper end thereof by the driving force of the actuator 340 and the elastic force of the return spring 360. Thus, the pedal pad 330 provided at the pedal arm 320 moves toward the rear surface 313 of the pedal housing 310 and seals the housing hole 311. In this case, the pedal pad 330 is in close contact with the rear surface 313 of the pedal housing 310, and thus the pedal pad 330 is hidden (refer to FIGS. 11 to 13).

When the pedal pad 330 is in a hidden state, in which the pedal pad 330 is in close contact with the rear surface 313 of the pedal housing 310, the space below the driver's seat becomes a broad space in which no pedal is present. Thus, the driver is capable of taking a comfortable rest in the relaxation mode.

In addition, when the pedal pad 330 is in the hidden state, in which the pedal pad 330 is in close contact with the rear surface 313 of the pedal housing 310, since the pedals are not exposed in the space below the driver's seat, it is possible to prevent erroneous operation of the pedals by the driver in the autonomous driving situation.

When the driver selects the manual driving mode, in which the driver manually drives the vehicle, the lower end of the pedal arm 320 is rotated backwards toward the driver about the pedal arm shaft 321 provided at the upper end thereof by the driving force of the actuator 340 and the deformation of the spring. Thus, the pedal pad 330 provided at the pedal arm 320 pops up, that is, protrudes backwards toward the driver from the housing hole 311 in the pedal housing 310 (refer to FIGS. 14 to 17).

When the pedal pad 330 is in a pop-up state, in which the pedal pad 330 protrudes backwards toward the driver due to the backward rotation of the pedal arm 320, the driver operates the pedal pad 330 with the foot to control acceleration or brake required for driving of the vehicle.

In the state in which the pedal pad 330 pops up, if the driver steps on the pedal pad 330, both the elastic force of the operating force spring 350 and the elastic force of the return spring 360 act as reaction force, thus generating pedal force.

Figure 18:
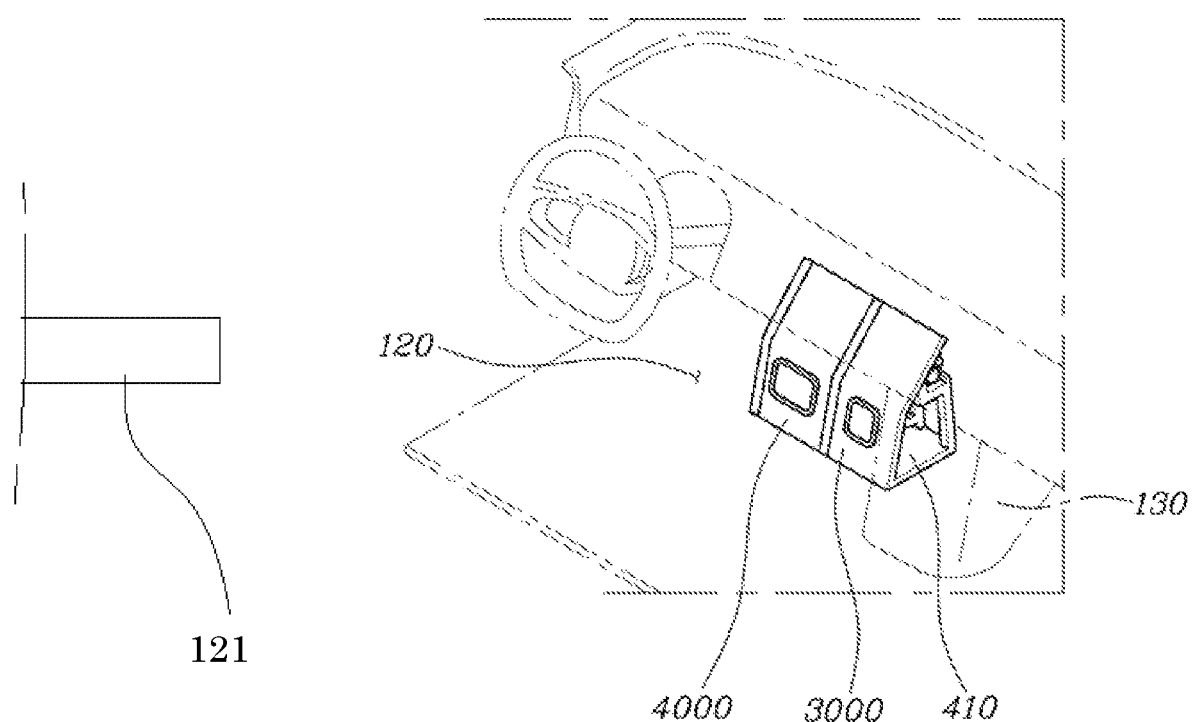
FIG. 18 is a view illustrating the configuration in which a pendant-type foldable accelerator pedal device and a pendant-type foldable brake pedal device according to the present invention are combined into one group and are mounted in the space below the driver's seat.
Figure 19:
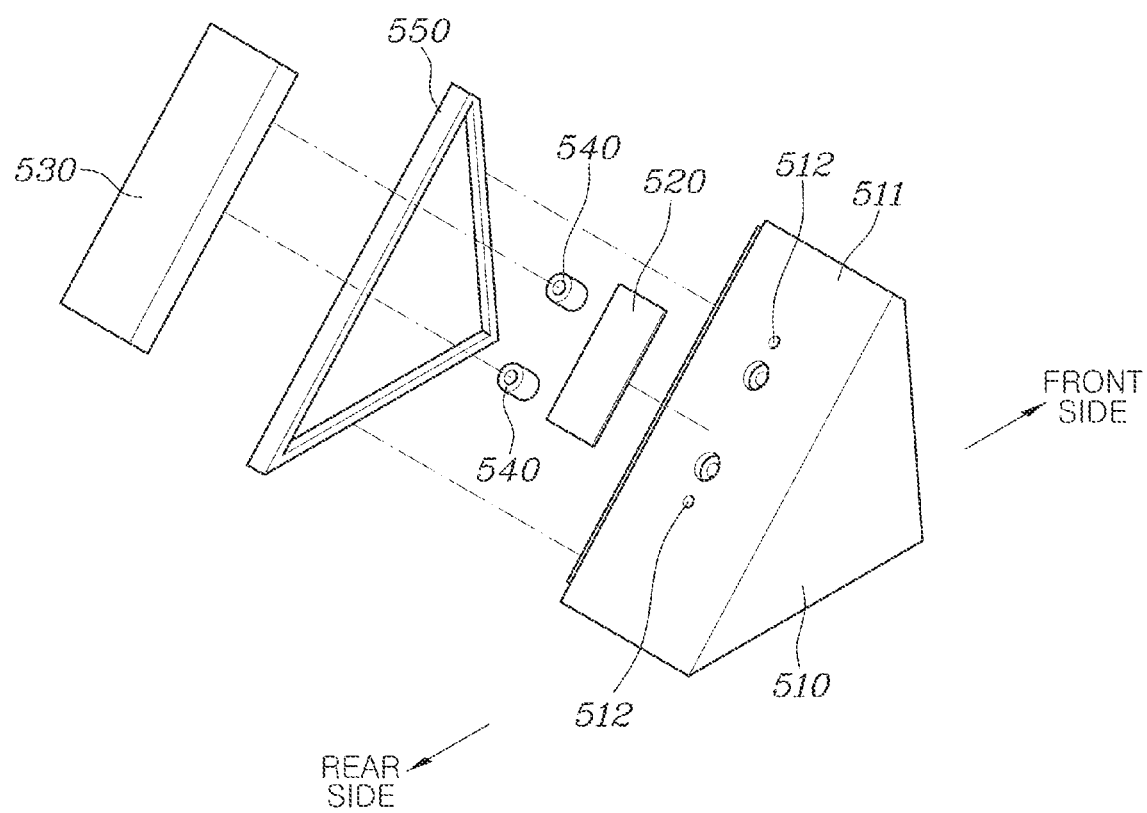
FIG. 19 is an exploded perspective view of a pressure-operation-type pedal device for autonomous vehicles according to the present invention.
Figure 20:
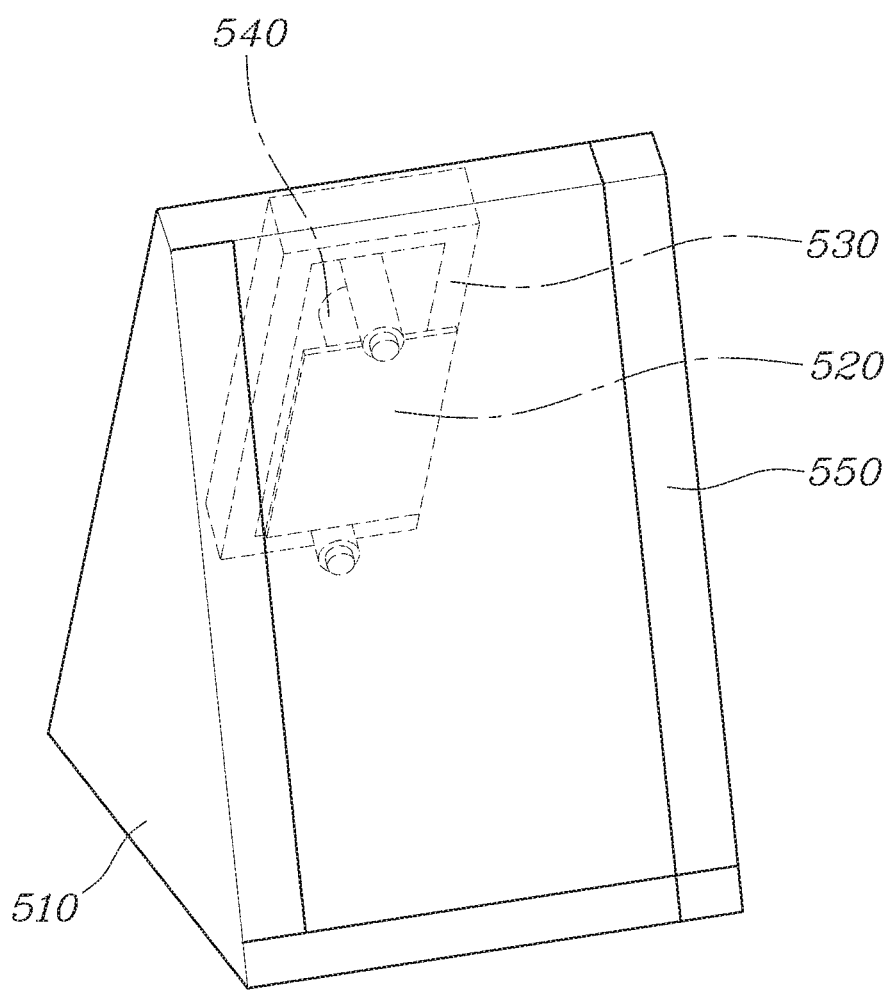
FIG. 20 is a rear perspective view illustrating the coupled state of FIG. 19.
Figure 21:
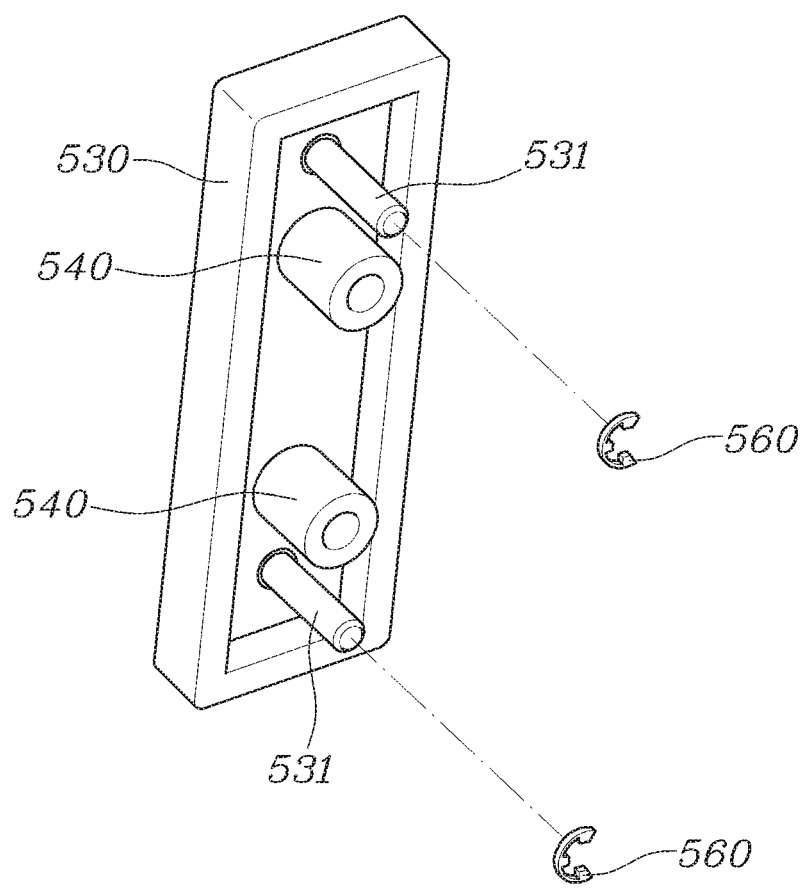
FIG. 21 is a rear perspective view illustrating a pedal pad shown in FIG. 19.

Meanwhile, as shown in FIG. 18, the pendant-type foldable pedal device according to the embodiment of the present invention may be used both as a pendant-type foldable accelerator pedal device 3000 and as a pendant-type foldable brake pedal device 4000 in one autonomous vehicle.

As described above, in the case in which the pendant-type foldable pedal device according to the present invention is used both as the pendant-type foldable accelerator pedal device 3000 and as the pendant-type foldable brake pedal device 4000 in one autonomous vehicle, the pendant-type foldable accelerator pedal device 3000 is mounted so as to be in close contact with the side surface of the console 130 in the space 120 below the driver's seat, and the pendant-type foldable brake pedal device 4000 is mounted so as to be in close contact with one side surface of the pendant-type foldable accelerator pedal device 3000.

In this case, the side surface of the pedal housing 310 of the pendant-type foldable accelerator pedal device 3000, which closely contacts the console 130, has an open structure 410 without the side cover 390. However, the open structure 410 is shielded by the console 130, and thus is not exposed to the outside, thereby preventing introduction of foreign substances and reducing the weight and manufacturing costs of the product.

In addition, each of the opposite side surface of the pendant-type foldable accelerator pedal device 3000, which closely contacts the pendant-type foldable brake pedal device 4000, and the two opposite side surfaces of the pendant-type foldable brake pedal device 4000 has a structure that is sealed by the side cover 390, thereby securing a sufficient amount of strength and rigidity, avoiding exposure to the outside, and preventing introduction of foreign substances.

FIGS. 19 to 22 illustrate a pressure-operation-type pedal device. The pressure-operation-type pedal device has a configuration that enables use thereof in autonomous vehicles. In particular, the pressure-operation-type pedal device has a configuration such that it is capable of being used both as a pressure-operation-type accelerator pedal device and as a pressure-operation-type brake pedal device.

As illustrated, the pressure-operation-type pedal device includes a pedal housing 510, which is fixedly installed in the space 120 below the driver's seat, a pressure sensor 520, which is secured to a rear surface 511 of the pedal housing 510 that is oriented toward the driver, a pedal pad 530, which is secured to the rear surface 511 of the pedal housing 510 and is located on the front surface of the pressure sensor 520, an elastic damper 540, which is coupled to the bottom surface of the pedal pad 530 and is in contact with the pressure sensor 520, and a side cover 550, which is coupled to the side surface of the pedal housing 510.

The pedal housing 510 has an external appearance that is formed in a triangular shape such that the front surface thereof is secured to the dash panel, which constitutes the vehicle body, such that the bottom surface thereof is secured to the floor panel, which constitutes the vehicle body, in the space below the driver's seat, and such that the interior thereof is empty.

The front surface and the bottom surface of the pedal housing 510 are disposed so as to be perpendicular to each other. The rear surface 511, which is oriented toward the driver, is disposed at an incline.

The pressure sensor 520 is secured to the rear surface 511 of the pedal housing 510. The pressure sensor 520 may be configured as a printed circuit board (PCB).

The pedal pad 530, on which the driver steps, is secured to the rear surface 511 of the pedal housing 510. To this end, a plurality of coupling protrusions 531 is formed so as to protrude from the rear surface of the pedal pad 530. The coupling protrusions 531 of the pedal pad 530 pass through coupling holes 512 formed in the rear surface 511 of the pedal housing 510. Fixing clips 560 are coupled to end portions of the coupling protrusions 531, which pass through the coupling holes 512. As a result, the pedal pad 530 is secured to the rear surface 511 of the pedal housing 510.

In particular, the pedal pad 530 secured to the rear surface 511 of the pedal housing 510 is located on the front surface of the pressure sensor 520.

The elastic damper 540 is mounted such that one end thereof is secured to the rear surface of the pedal pad 530 and the opposite end thereof is in contact with the pressure sensor 520. When the driver steps on the pedal pad 530, the elastic damper 540 generates pedal force using the elastic force thereof.

The elastic damper 540 may be made of any one of rubber, silicon, and synthetic resin, which has an elastic property, in order to prevent the occurrence of noise. However, the present invention is not limited thereto.

Figure 22:
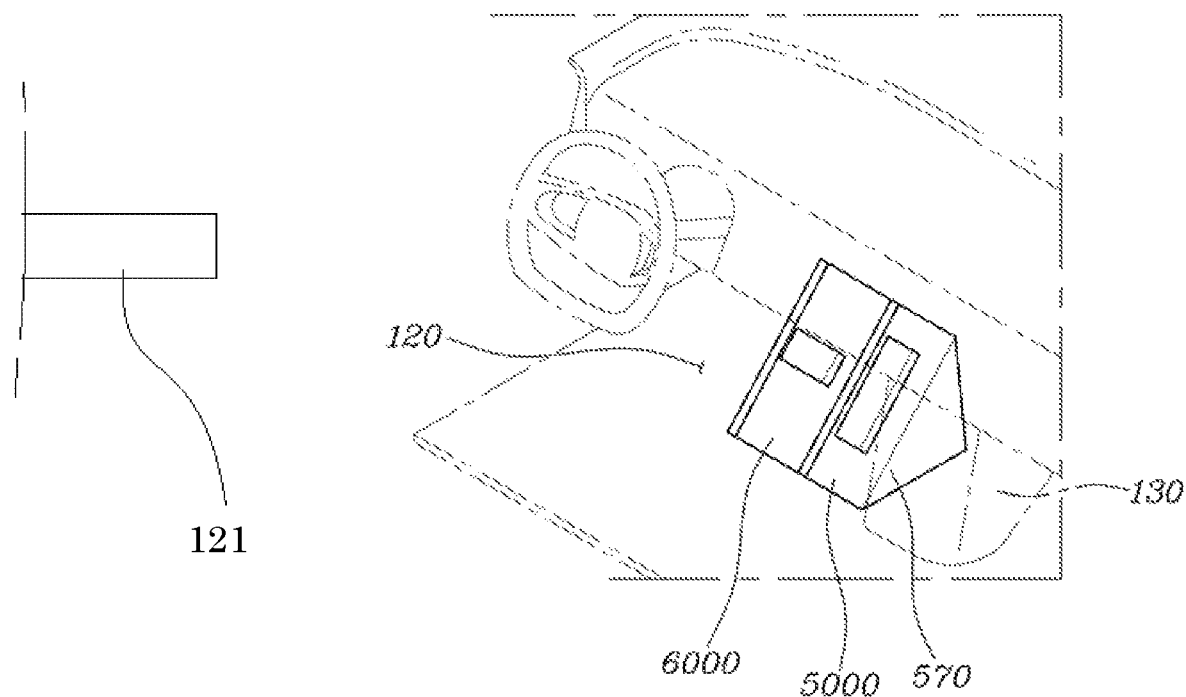
FIG. 22 is a view illustrating the configuration in which a pressure-operation-type accelerator pedal device and a pressure-operation-type brake pedal device according to the present invention are combined into one group and are mounted in the space below the driver's seat.

Meanwhile, as shown in FIG. 22, the pressure-operation-type pedal device according to the embodiment of the present invention may be used both as a pressure-operation-type accelerator pedal device 5000 and as a pressure-operation-type brake pedal device 6000 in one autonomous vehicle.

Thus, when the driver steps on the pedal pad 530, the pressure generated thereby is transmitted to the pressure sensor 520 through the elastic damper 540, and an acceleration signal and a brake signal required for driving of the vehicle are generated using a pressure signal detected by the pressure sensor 520.

As described above, in the case in which the pressure-operation-type pedal device according to the present invention is used both as the pressure-operation-type accelerator pedal device 5000 and as the pressure-operation-type brake pedal device 6000 in one autonomous vehicle, the pressure-operation-type accelerator pedal device 5000 is mounted so as to be in close contact with the side surface of the console 130 in the space 120 below the driver's seat, and the pressure-operation-type brake pedal device 6000 is mounted so as to be in close contact with one side surface of the pressure-operation-type accelerator pedal device 5000.

In this case, the side surface of the pedal housing 510 of the pressure-operation-type accelerator pedal device 5000, which closely contacts the console 130, has an open structure 570 without the side cover 550. However, the open structure 570 is shielded by the console 130, and thus is not exposed to the outside, thereby preventing introduction of foreign substances and reducing the weight and manufacturing costs of the product.

In addition, each of the opposite side surface of the pressure-operation-type accelerator pedal device 5000, which closely contacts the pressure-operation-type brake pedal device 6000, and the two opposite side surfaces of the pressure-operation-type brake pedal device 6000 has a structure that is sealed by the side cover 550, thereby securing a sufficient amount of strength and rigidity, avoiding exposure to the outside, and preventing introduction of foreign substances.

As described above, the foldable pedal device for autonomous vehicles according to the present invention has a configuration such that it is capable of being used both as a foldable accelerator pedal device and as a foldable brake pedal device.

In particular, the foldable accelerator pedal device includes any one of the organ-type foldable accelerator pedal device 1000, the pendant-type foldable accelerator pedal device 3000, and a pressure-operation-type accelerator pedal device 5000, and the foldable brake pedal device includes any one of the organ-type foldable brake pedal device 2000, the pendant-type foldable brake pedal device 4000, and the pressure-operation-type brake pedal device 6000. Any one type of foldable accelerator pedal device and any one type of foldable brake pedal device may be selectively combined into one group depending on the driver's preference, and may be mounted in the space 120 below the driver's seat of an autonomous vehicle. As a result, it is possible to satisfy various drivers' preferences and thus to enhance marketability of the product.

When any one type of foldable accelerator pedal device and any one type of foldable brake pedal device are selectively combined into one group and are mounted in the space 120 below the driver's seat, the foldable accelerator pedal device is mounted such that one side surface thereof is in close contact with the side surface of the console 130 in the space 120 below the driver's seat, and the foldable brake pedal device is mounted such that one side surface thereof is in close surface contact with the opposite side surface of the foldable accelerator pedal device.

Figure 23:
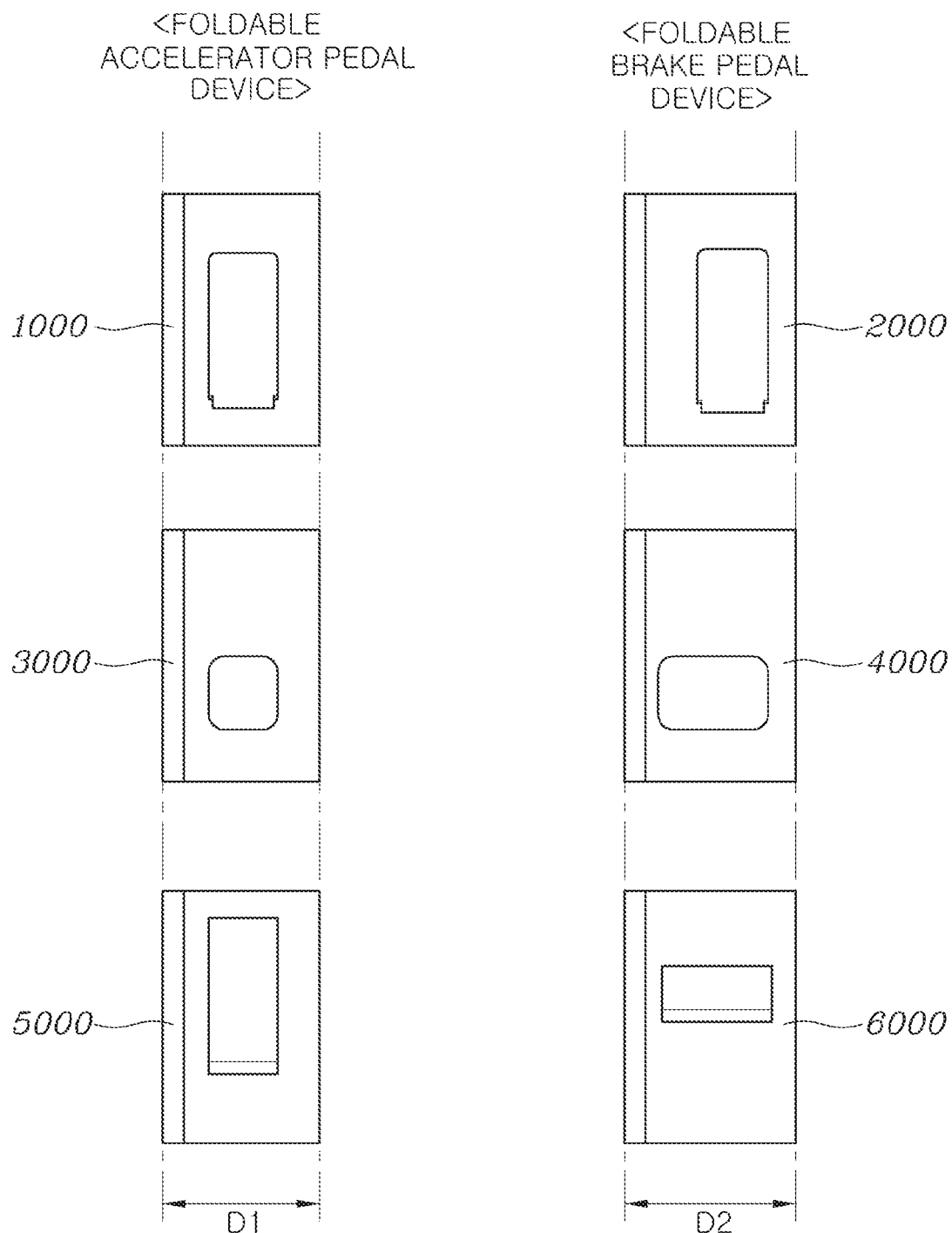
FIGS. 23 and 24 are views illustrating the shapes and the arrangement of the foldable accelerator pedal device and the foldable brake pedal device according to the present invention.

Meanwhile, in order to conveniently combine the foldable accelerator pedal device and the foldable brake pedal device, as shown in FIG. 23, the foldable accelerator pedal devices 1000, 3000 and 5000 may be formed to have the same width D1 in the leftward-rightward direction, and the foldable brake pedal devices 2000, 4000 and 6000 may be formed to have the same width D2 in the leftward-rightward direction.

Figure 24:
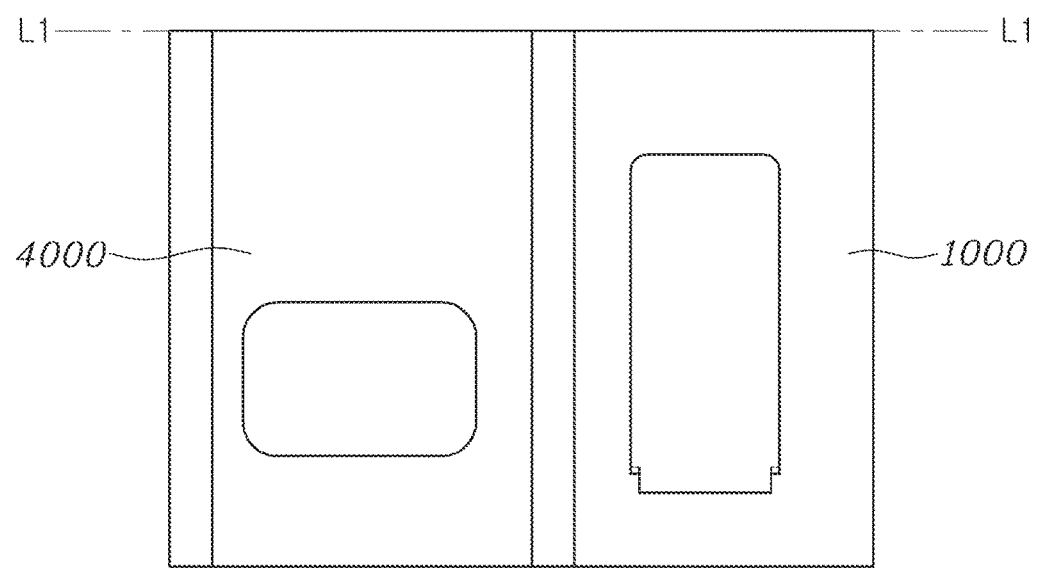

In addition, as shown in FIG. 24, any one type of foldable accelerator pedal device and any one type of foldable brake pedal device may be selectively combined into one group, and may be mounted in the space 120 below the driver's seat such that the top surface of the foldable accelerator pedal device 1000 and the top surface of the foldable brake pedal device 4000 match each other without a height difference therebetween in the upward-downward direction (refer to the line L1), thereby smoothly realizing the combination of the foldable accelerator pedal device and the foldable brake pedal device.

The configuration in which any one type of foldable accelerator pedal device and any one type of foldable brake pedal device are selectively combined into one group will be described below.

The first case, as shown in FIG. 9, has a structure in which the organ-type foldable accelerator pedal device 1000 and the organ-type foldable brake pedal device 2000 are combined into one group, and are mounted in the space 120 below the driver's seat.

The second case, as shown in FIG. 18, has a structure in which the pendant-type foldable accelerator pedal device 3000 and the pendant-type foldable brake pedal device 4000 are combined into one group, and are mounted in the space 120 below the driver's seat.

The third case, as shown in FIG. 22, has a structure in which the pressure-operation-type accelerator pedal device 5000 and the pressure-operation-type brake pedal device 6000 are combined into one group, and are mounted in the space 120 below the driver's seat.

Figure 25:
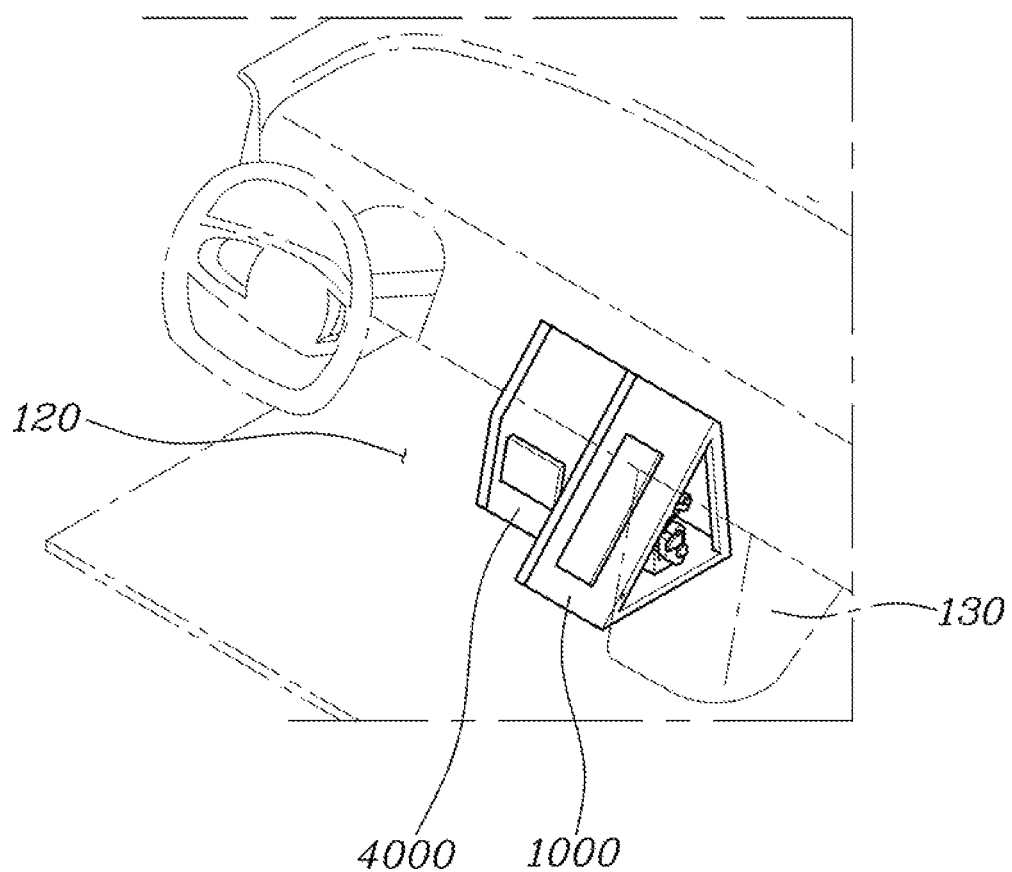
FIG. 25 is a view illustrating the configuration in which the organ-type foldable accelerator pedal device and the pendant-type foldable brake pedal device according to the present invention are combined into one group and are mounted in the space below the driver's seat.

The fourth case, as shown in FIG. 25, has a structure in which the organ-type foldable accelerator pedal device 1000 and the pendant-type foldable brake pedal device 4000 are combined into one group, and are mounted in the space 120 below the driver's seat.

Figure 26:
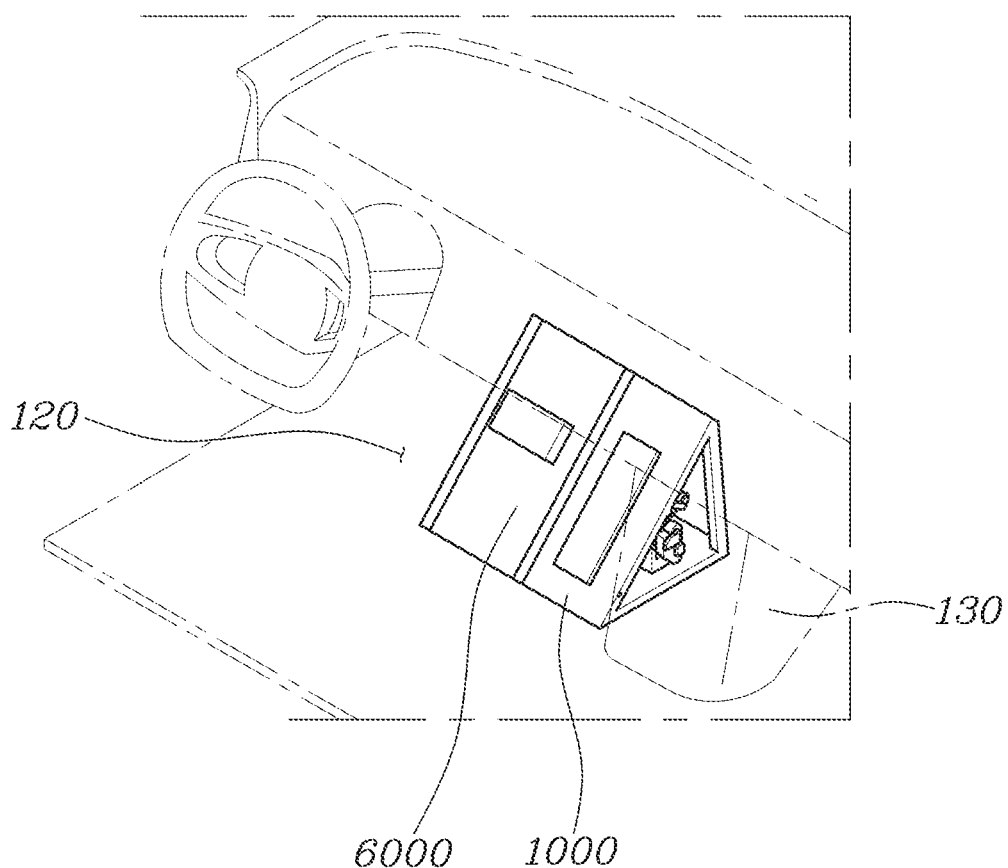
FIG. 26 is a view illustrating the configuration in which the organ-type foldable accelerator pedal device and the pressure-operation-type brake pedal device according to the present invention are combined into one group and are mounted in the space below the driver's seat.

The fifth case, as shown in FIG. 26, has a structure in which the organ-type foldable accelerator pedal device 1000 and the pressure-operation-type brake pedal device 6000 are combined into one group, and are mounted in the space 120 below the driver's seat.

Figure 27:
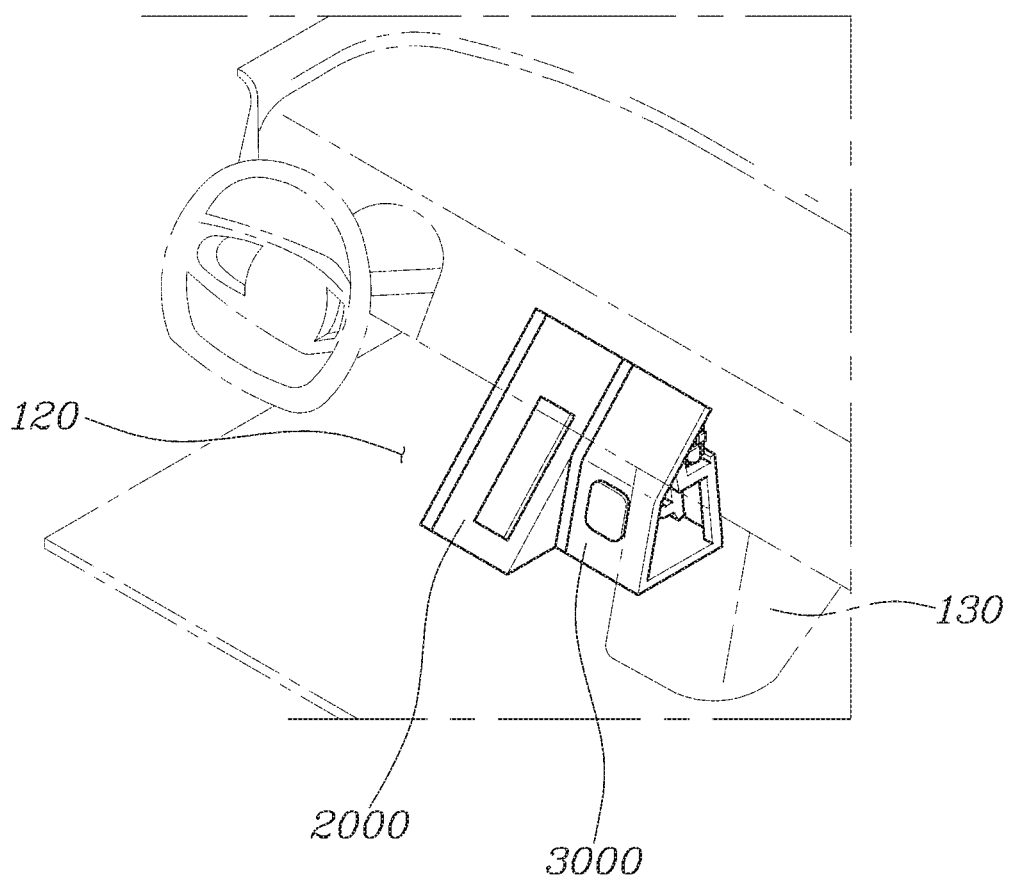
FIG. 27 is a view illustrating the configuration in which the pendant-type foldable accelerator pedal device and the organ-type foldable brake pedal device according to the present invention are combined into one group and are mounted in the space below the driver's seat.

The sixth case, as shown in FIG. 27, has a structure in which the pendant-type foldable accelerator pedal device 3000 and the organ-type foldable brake pedal device 2000 are combined into one group, and are mounted in the space 120 below the driver's seat.

Figure 28:
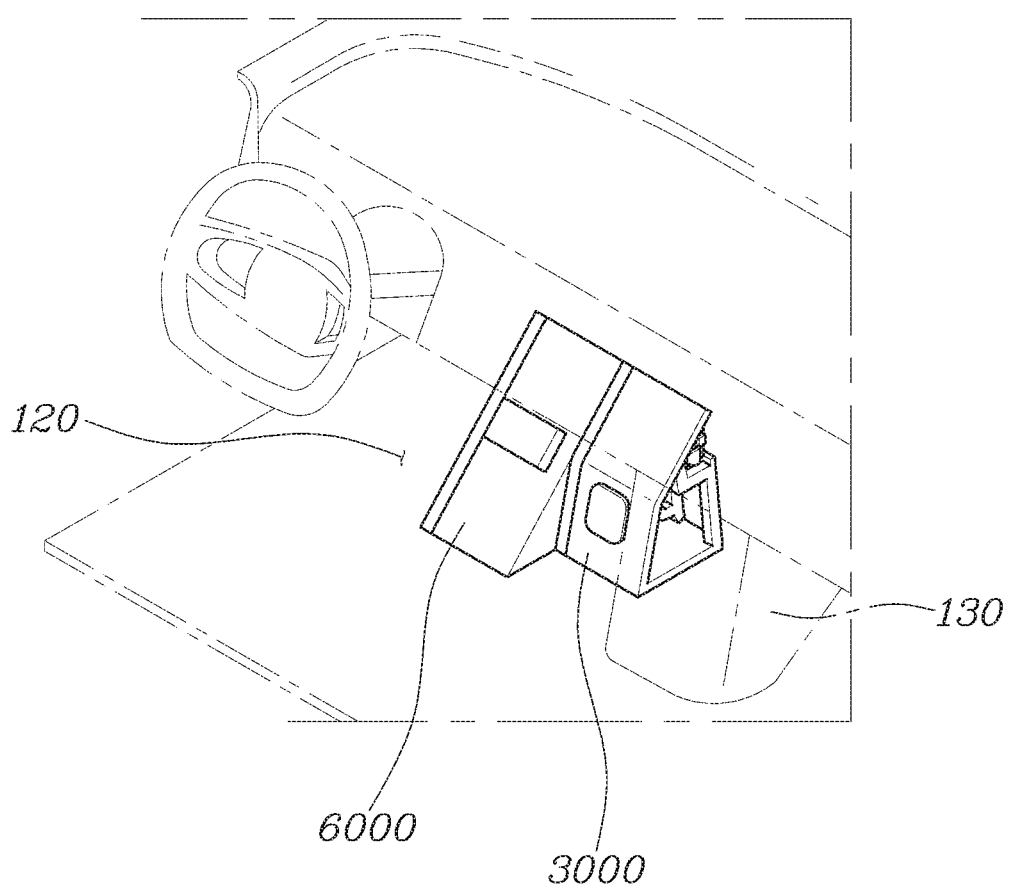
FIG. 28 is a view illustrating the configuration in which the pendant-type foldable accelerator pedal device and the pressure-operation-type brake pedal device according to the present invention are combined into one group and are mounted in the space below the driver's seat.

The seventh case, as shown in FIG. 28, has a structure in which the pendant-type foldable accelerator pedal device 3000 and the pressure-operation-type brake pedal device 6000 are combined into one group, and are mounted in the space 120 below the driver's seat.

Figure 29:
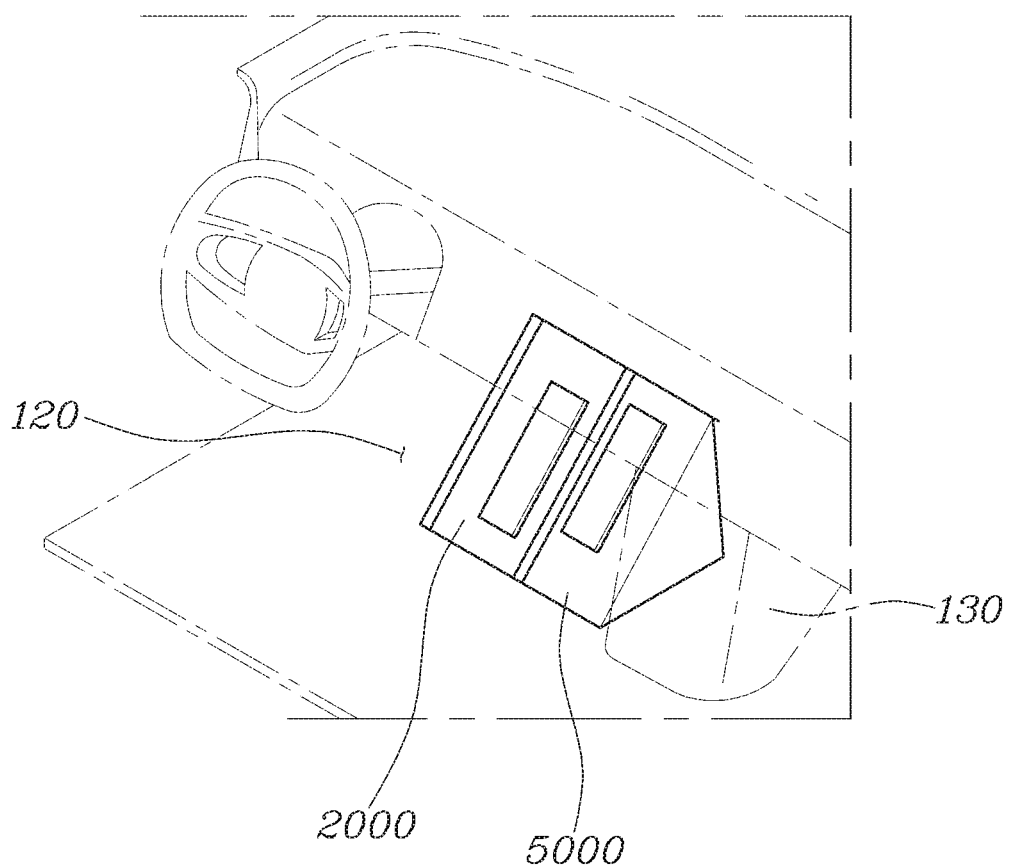
FIG. 29 is a view illustrating the configuration in which the pressure-operation-type accelerator pedal device and the organ-type foldable brake pedal device according to the present invention are combined into one group and are mounted in the space below the driver's seat.
Figure 30:
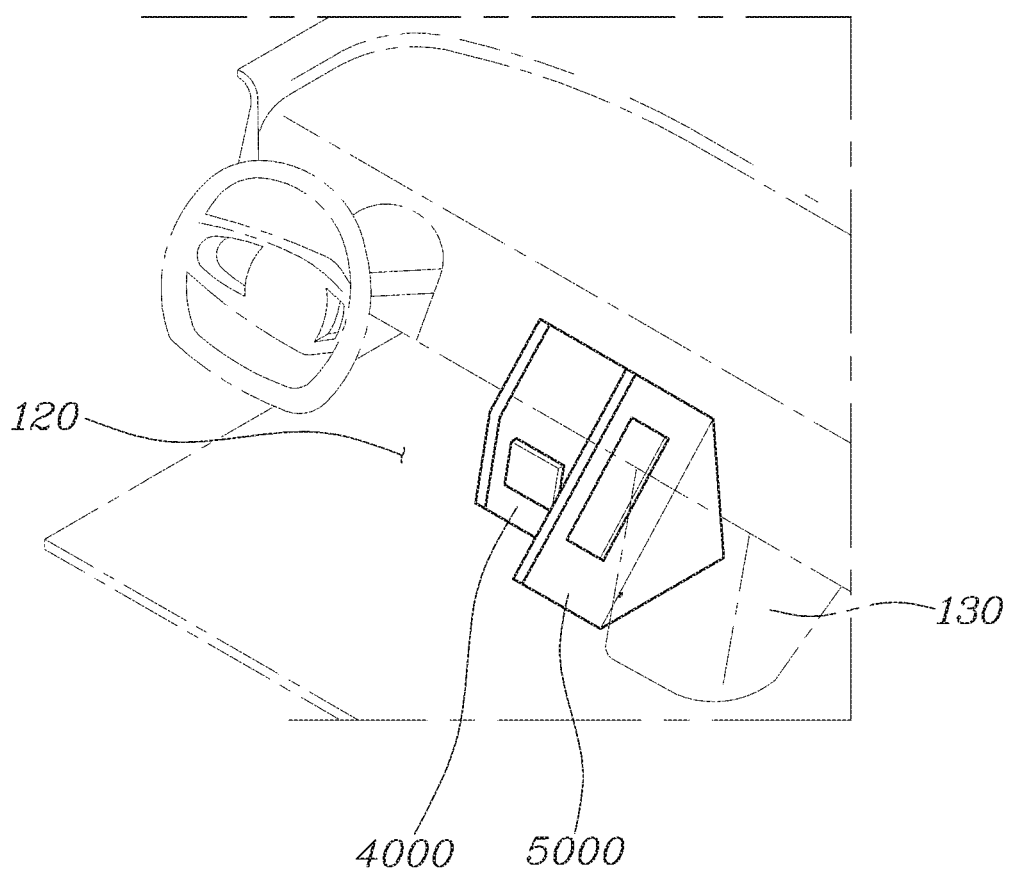
FIG. 30 is a view illustrating the configuration in which the pressure-operation-type accelerator pedal device and the pendant-type foldable brake pedal device according to the present invention are combined into one group and are mounted in the space below the driver's seat.

The eighth case, as shown in FIG. 29, has a structure in which the pressure-operation-type accelerator pedal device 5000 and the organ-type foldable brake pedal device 2000 are combined into one group, and are mounted in the space 120 below the driver's seat.

As is apparent from the above description, according to the present invention, a foldable accelerator pedal device includes an organ-type foldable accelerator pedal device, a pendant-type foldable accelerator pedal device, and a pressure-operation-type accelerator pedal device, and a foldable brake pedal device includes an organ-type foldable brake pedal device, a pendant-type foldable brake pedal device, and a pressure-operation-type brake pedal device. Any one type of foldable accelerator pedal device and any one type of foldable brake pedal device may be selectively combined into one group depending on the driver's preference, and may be mounted in a space below the driver's seat of an autonomous vehicle. As a result, it is possible to satisfy various drivers' preferences and thus to enhance marketability of the product.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An autonomous vehicle comprising:
a driver's seat;
a foldable accelerator pedal device configured to be folded, wherein the foldable accelerator pedal device comprises an organ foldable accelerator pedal device, a pendant foldable accelerator pedal device, or a pressure-operation accelerator pedal device; and
a foldable brake pedal device configured to be folded, wherein the foldable brake pedal device comprises an organ foldable brake pedal device, a pendant foldable brake pedal device, or a pressure-operation brake pedal device;
wherein the foldable accelerator pedal device and the foldable brake pedal device are mounted in a space below the driver's seat;
wherein the space below the driver's seat is configured to accommodate any one of the organ foldable accelerator pedal device, the pendant foldable accelerator pedal device, and the pressure-operation accelerator pedal device in combination with any one of the organ foldable brake pedal device, the pendant foldable brake pedal device, and the pressure-operation brake pedal device;
wherein each of the foldable accelerator pedal device and the foldable brake pedal device comprises a pedal housing having a predetermined shape to define an external appearance thereof, and the pedal housing is fixedly installed in the space below the driver's seat;
wherein each of the pedal housings comprises a housing hole formed in a rear portion of the pedal housing, the housing hole being oriented toward the driver's seat, and a pedal pad located at the housing hole and having a lower end rotatably hinged to the pedal housing, wherein the pedal pad is configured to be rotatable to seal or protrude from the housing hole depending on a driving mode; and
wherein in an autonomous driving mode, the pedal pad is configured to be rotated to seal the housing hole in a hidden state, and in a manual driving mode, the pedal pad is configured to be rotated to protrude from the housing hole in a pop-up state.

2. The autonomous vehicle according to claim 1, wherein the pedal housing of the foldable accelerator pedal device and the pedal housing of the foldable brake pedal device are mounted so as to be in surface contact with each other.

3. The autonomous vehicle according to claim 1, wherein the foldable accelerator pedal device is mounted such that one side surface thereof is in contact with a side surface of a console in the space below the driver's seat; and
wherein the foldable brake pedal device is mounted such that one side surface thereof is in surface contact with an opposite side surface of the foldable accelerator pedal device.

4. The autonomous vehicle according to claim 1, wherein the organ foldable accelerator pedal device, the pendant foldable accelerator pedal device, and the pressure-operation accelerator pedal device have the same width in a direction parallel to a front surface of the pedal housing;
wherein the organ foldable brake pedal device, the pendant foldable brake pedal device, and the pressure-operation brake pedal device have the same width in a direction parallel to the front surface of the pedal housing; and
wherein the foldable accelerator pedal device, the foldable brake pedal device, and the space below the driver's seat are configured to accommodate any one of the organ foldable accelerator pedal device, the pendant foldable accelerator pedal device, and the pressure-operation accelerator pedal device and any one of the organ foldable brake pedal device, the pendant foldable brake pedal device, and the pressure-operation brake pedal device; and
wherein the foldable accelerator pedal device and the foldable brake pedal device are mounted in the space below the driver's seat such that a top surface of the foldable accelerator pedal device and a top surface of the foldable brake pedal device match each other without a height difference there between.

5. The autonomous vehicle according to claim 1, wherein the foldable accelerator pedal device comprises the organ foldable accelerator pedal device and the foldable brake pedal device comprises the organ foldable brake pedal device.

6. The autonomous vehicle according to claim 1, wherein the foldable accelerator pedal device comprises the pendant foldable accelerator pedal device and the foldable brake pedal device comprises the pendant foldable brake pedal device.

7. The autonomous vehicle according to claim 1, wherein the foldable accelerator pedal device comprises the pressure-operation accelerator pedal device and the foldable brake pedal device comprises the pressure-operation brake pedal device.

8. The autonomous vehicle according to claim 1, wherein the foldable accelerator pedal device comprises the organ foldable accelerator pedal device and the foldable brake pedal device comprises the pendant foldable brake pedal device.

9. The autonomous vehicle according to claim 1, wherein the foldable accelerator pedal device comprises the organ foldable accelerator pedal device and the foldable brake pedal device comprises the pressure-operation brake pedal device.

10. The autonomous vehicle according to claim 1, wherein the foldable accelerator pedal device comprises the pendant foldable accelerator pedal device and the foldable brake pedal device comprises the organ foldable brake pedal device.

11. The autonomous vehicle according to claim 1, wherein the foldable accelerator pedal device comprises the pendant foldable accelerator pedal device and the foldable brake pedal device comprises the pressure-operation brake pedal device.

12. The autonomous vehicle according to claim 1, wherein the foldable accelerator pedal device comprises the pressure-operation accelerator pedal device and the foldable brake pedal device comprises the organ foldable brake pedal device.

13. The autonomous vehicle according to claim 1, wherein the foldable accelerator pedal device comprises the pressure-operation accelerator pedal device and the foldable brake pedal device comprises the pendant foldable brake pedal device.

14. A method of assembling an autonomous vehicle, the method comprising:
provides a foldable accelerator pedal device configured to be folded and a foldable brake pedal device configured to be folded, wherein the foldable accelerator pedal device comprises any one of an organ foldable accelerator pedal device, a pendant foldable accelerator pedal device, and a pressure-operation accelerator pedal device and wherein the foldable brake pedal device comprises any one of an organ foldable brake pedal device, a pendant foldable brake pedal device, and a pressure-operation brake pedal device;
selecting any one of the organ foldable accelerator pedal device, the pendant foldable accelerator pedal device, and the pressure-operation accelerator pedal device as the foldable accelerator pedal device;
selecting any one of the organ foldable brake pedal device, the pendant foldable brake pedal device, and the pressure-operation brake pedal device as the foldable brake pedal device; and
mounting the selected the foldable accelerator pedal device and the foldable brake pedal device in a space adjacent a driver's seat of a vehicle body, wherein the vehicle body is configured so as to be able to accommodate any one of the organ foldable accelerator pedal device, the pendant foldable accelerator pedal device, and the pressure-operation accelerator pedal device in combination with any one of the organ foldable brake pedal device, the pendant foldable brake pedal device, and the pressure-operation brake pedal device, wherein each of the foldable accelerator pedal device and the foldable brake pedal device each comprises a pedal housing having a predetermined shape to define an external appearance thereof, and the pedal housing is fixedly installed in the space below the driver's seat, wherein each of the pedal housings comprises a housing hole formed in a rear portion of the pedal housing, the housing hole being oriented toward the driver's seat, and a pedal pad located at the housing hole and having a lower end rotatably hinged to the pedal housing, wherein the pedal pad rotates to seal or protrude from the housing hole depending on a driving mode, and wherein in an autonomous driving mode, the pedal pad rotates to seal the housing hole in a hidden state, and in a manual driving mode, the pedal pad rotates to protrude from the housing hole in a pop-up state.

15. The method according to claim 14, wherein providing the foldable accelerator pedal device comprises providing an organ foldable accelerator pedal device, a pendant foldable accelerator pedal device, and a pressure-operation accelerator pedal device; and
wherein providing the foldable brake pedal device comprises providing an organ foldable brake pedal device, a pendant foldable brake pedal device, and a pressure-operation brake pedal device.

16. The method according to claim 15, wherein the organ foldable accelerator pedal device, the pendant foldable accelerator pedal device, and the pressure-operation accelerator pedal device have the same width in a direction parallel to a front surface of the pedal housing; and
wherein the organ foldable brake pedal device, the pendant foldable brake pedal device, and the pressure-operation brake pedal device have the same width in a direction parallel to the front surface of the pedal housing.

17. The method according to claim 16, wherein the mounting comprises mounting the selected foldable accelerator pedal device and the selected foldable accelerator pedal device in the space adjacent the driver's seat such that a top surface of the foldable accelerator pedal device and a top surface of the foldable brake pedal device match each other without a height difference there between.

18. The method according to claim 15, wherein the mounting comprises mounting the selected foldable accelerator pedal device and the selected foldable accelerator pedal device in the space adjacent the driver's seat such that a top surface of the foldable accelerator pedal device and a top surface of the foldable brake pedal device match each other without a height difference there between.

19. The method according to claim 15, wherein the selecting is performed so that:
the foldable accelerator pedal device comprises the organ foldable accelerator pedal device and the foldable brake pedal device comprises the organ foldable brake pedal device; or
the foldable accelerator pedal device comprises the pendant foldable accelerator pedal device and the foldable brake pedal device comprises the pendant foldable brake pedal device; or
the foldable accelerator pedal device comprises the pressure-operation accelerator pedal device and the foldable brake pedal device comprises the pressure-operation brake pedal device; or
the foldable accelerator pedal device comprises the organ foldable accelerator pedal device and the foldable brake pedal device comprises the pendant foldable brake pedal device; or
the foldable accelerator pedal device comprises the organ foldable accelerator pedal device and the foldable brake pedal device comprises the pressure-operation brake pedal device; or
the foldable accelerator pedal device comprises the pendant foldable accelerator pedal device and the foldable brake pedal device comprises the organ foldable brake pedal device; or
the foldable accelerator pedal device comprises the pendant foldable accelerator pedal device and the foldable brake pedal device comprises the pressure-operation brake pedal device; or
the foldable accelerator pedal device comprises the pressure-operation accelerator pedal device and the foldable brake pedal device comprises the organ foldable brake pedal device; or the foldable accelerator pedal device comprises the pressure-operation accelerator pedal device and the foldable brake pedal device comprises the pendant foldable brake pedal device.

20. An autonomous vehicle comprising:
a driver's seat;
a foldable accelerator pedal device configured to be folded, wherein the foldable accelerator pedal device comprises an organ foldable accelerator pedal device, a pendant foldable accelerator pedal device, or a pressure-operation accelerator pedal device; and
a foldable brake pedal device configured to be folded, wherein the foldable brake pedal device comprises an organ foldable brake pedal device, a pendant foldable brake pedal device, or a pressure-operation brake pedal device;
wherein the foldable accelerator pedal device and the foldable brake pedal device are mounted in a space below the driver's seat;
wherein the space below the driver's seat is configured to accommodate any one of the organ foldable accelerator pedal device, the pendant foldable accelerator pedal device, and the pressure-operation accelerator pedal device in combination with any one of the organ foldable brake pedal device, the pendant foldable brake pedal device, and the pressure-operation brake pedal device;
wherein each of the foldable accelerator pedal device and the foldable brake pedal device comprises a pedal housing having a predetermined shape to define an external appearance thereof, and the pedal housing is fixedly installed in the space below the driver's seat;
wherein the pedal housing of the foldable accelerator pedal device and the pedal housing of the foldable brake pedal device are mounted so as to be in surface contact with each other;
wherein each of the pedal housings comprises a housing hole formed in a rear portion of the pedal housing, the housing hole being oriented toward the driver's seat, and a pedal pad located at the housing hole and having a lower end rotatably hinged to the pedal housing;
wherein the pedal pad is configured to be rotatable to seal or protrude from the housing hole depending on a driving mode;
wherein in an autonomous driving mode, the pedal pad is configured to be rotated to seal the housing hole in a hidden state, and in a manual driving mode, the pedal pad is configured to be rotated to protrude from the housing hole to be in a pop-up state;
wherein the organ foldable accelerator pedal device, the pendant foldable accelerator pedal device, and the pressure-operation accelerator pedal device have the same width in a direction parallel to a front surface of the pedal housing;
wherein the organ foldable brake pedal device, the pendant foldable brake pedal device, and the pressure-operation brake pedal device have the same width in a direction parallel to the front surface of the pedal housing;
wherein the foldable accelerator pedal device, the foldable brake pedal device, and the space below the driver's seat are configured to accommodate any one of the organ foldable accelerator pedal device, the pendant foldable accelerator pedal device, and the pressure-operation accelerator pedal device and any one of the organ foldable brake pedal device, the pendant foldable brake pedal device, and the pressure-operation brake pedal device; and
wherein the foldable accelerator pedal device and the foldable brake pedal device are mounted in the space below the driver's seat such that a top surface of the foldable accelerator pedal device and a top surface of the foldable brake pedal device match each other without a height difference therebetween.

\* \* \* \* \*

UNITED STATES PATENT AND TRADEMARK OFFICE
CERTIFICATE OF CORRECTION

PATENT NO. : 10,946,741 B1  Page 1 of 1
APPLICATION NO. : 16/886644
DATED : March 16, 2021
INVENTOR(S) : Eun Sik Kim It is certified that error appears in the above-identified patent and that said Letters Patent is hereby corrected as shown below:

In the Claims

In Column 17, Line 50, Claim 14, delete "device each comprises" and insert --device comprises--.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*